(12) United States Patent
Ebe

(10) Patent No.: US 9,995,925 B2
(45) Date of Patent: Jun. 12, 2018

(54) OBSERVATION OPTICAL SYSTEM, AND IMAGE DISPLAYING APPARATUS HAVING THE SAME

(71) Applicant: CANON KABUSHIKI KAISHA, Tokyo (JP)

(72) Inventor: Hiroki Ebe, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 15/155,422

(22) Filed: May 16, 2016

(65) Prior Publication Data

US 2016/0363758 A1 Dec. 15, 2016

(30) Foreign Application Priority Data

Jun. 10, 2015 (JP) .................................. 2015-117448

(51) Int. Cl.

| | |
|---|---|
| G02B 25/00 | (2006.01) |
| G02B 21/02 | (2006.01) |
| G02B 9/14 | (2006.01) |
| G02B 9/16 | (2006.01) |
| G02B 25/04 | (2006.01) |
| G02B 27/02 | (2006.01) |
| G02B 13/00 | (2006.01) |
| G02B 5/00 | (2006.01) |
| G02B 13/18 | (2006.01) |
| G02B 9/12 | (2006.01) |

(52) U.S. Cl.
CPC ............ G02B 25/001 (2013.01); G02B 9/16 (2013.01); G02B 13/0035 (2013.01); G02B 25/04 (2013.01); G02B 27/027 (2013.01); G02B 5/005 (2013.01); G02B 9/12 (2013.01); G02B 9/14 (2013.01); G02B 13/18 (2013.01)

(58) Field of Classification Search
CPC ...... G02B 13/0035; G02B 13/18; G02B 9/12; G02B 9/16; G02B 25/001; G02B 9/14; G02B 5/005; G02B 25/04; G02B 27/027
USPC .......................... 359/645, 661, 716, 739, 785
See application file for complete search history.

(56) References Cited

U.S. PATENT DOCUMENTS

| | | | |
|---|---|---|---|
| 7,738,179 B2 | 6/2010 | Nishi | |
| 9,104,019 B2 | 8/2015 | Okano | |
| 2013/0050852 A1* | 2/2013 | Kubota | ................... G02B 9/16 359/785 |

* cited by examiner

*Primary Examiner* — Evelyn A Lester
(74) *Attorney, Agent, or Firm* — Carter, DeLuca, Farrell & Schmidt, LLP

(57) ABSTRACT

In order to obtain an observation optical system which has high optical performance while having a wide field of view, and can easily reduce variation of aberration at the time when an eye relief has changed, the present invention provides an observation optical system which is used for an observer to observe an image displayed on an image display surface, and includes in order from an observation side to an image displaying surface side: a first lens having a positive refractive power; a second lens having a negative refractive power; and a third lens having a positive refractive power, wherein a focal length f1 of the first lens, a focal length f2 of the second lens and a focal length f3 of the third lens are each appropriately set so as to satisfy the conditional expression of:

$$0.40 < \frac{f1}{\sqrt{-f2 \times f3}} < 0.80.$$

14 Claims, 17 Drawing Sheets

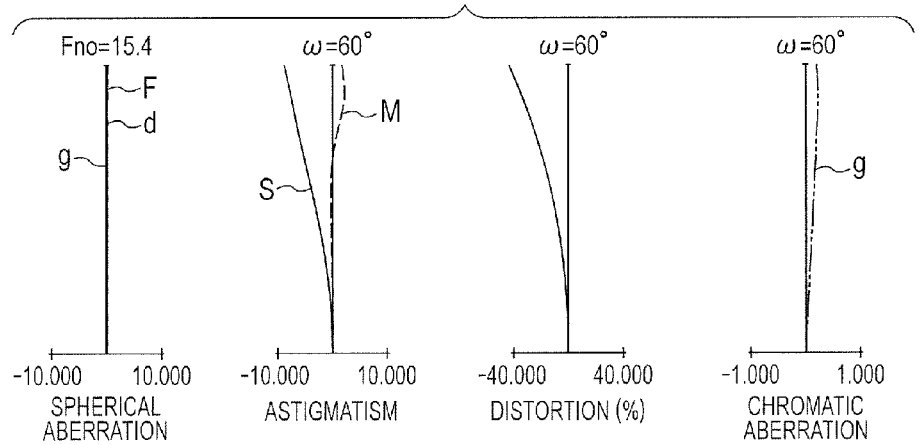
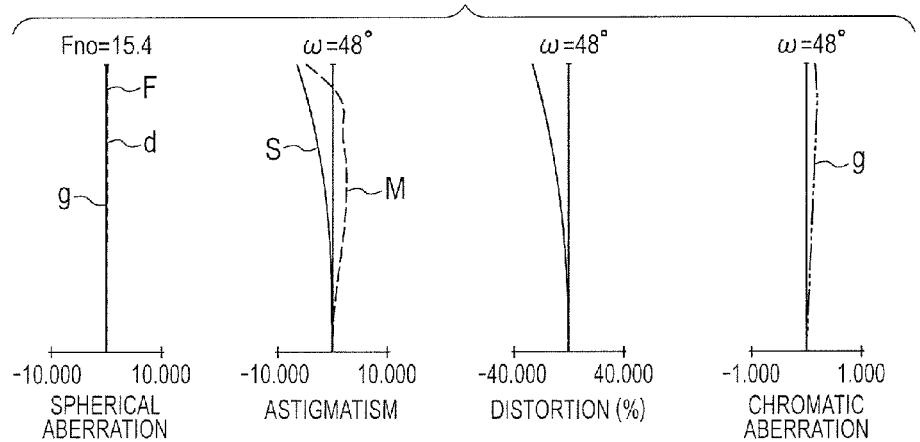
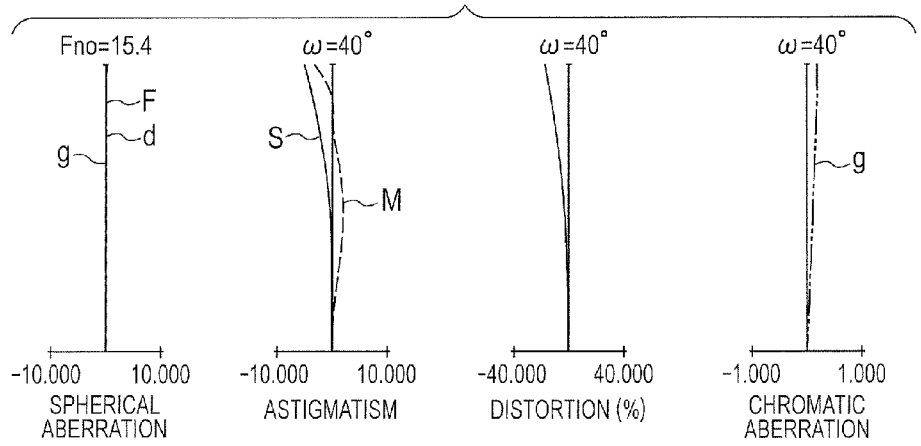

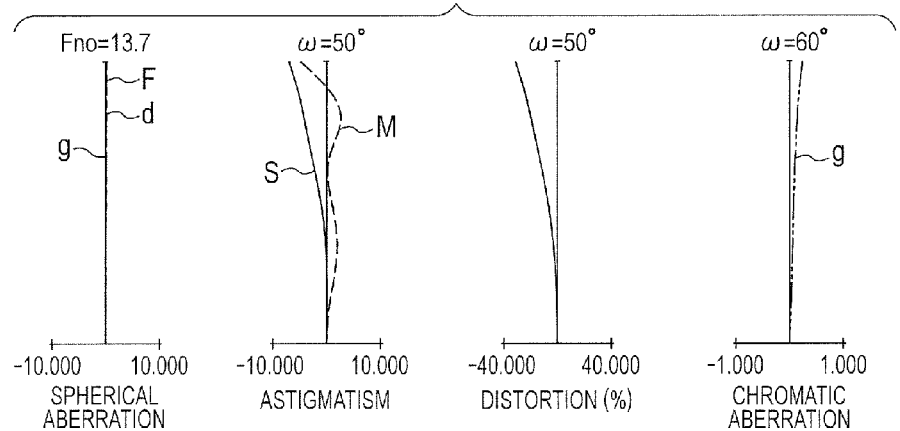
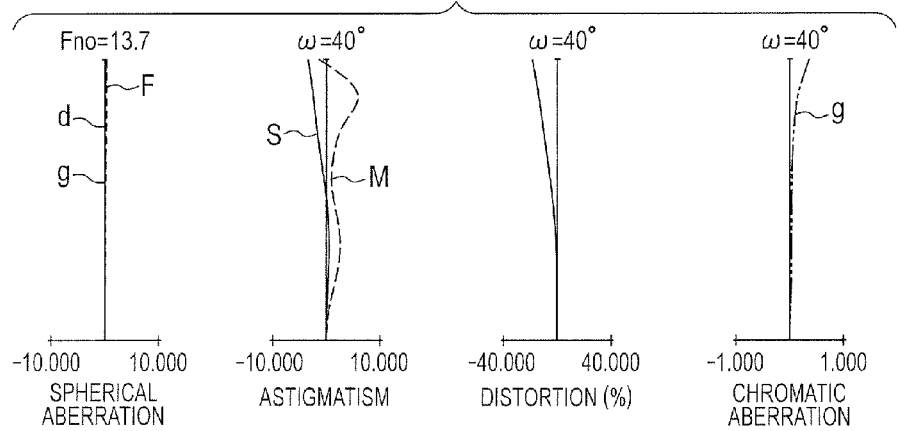
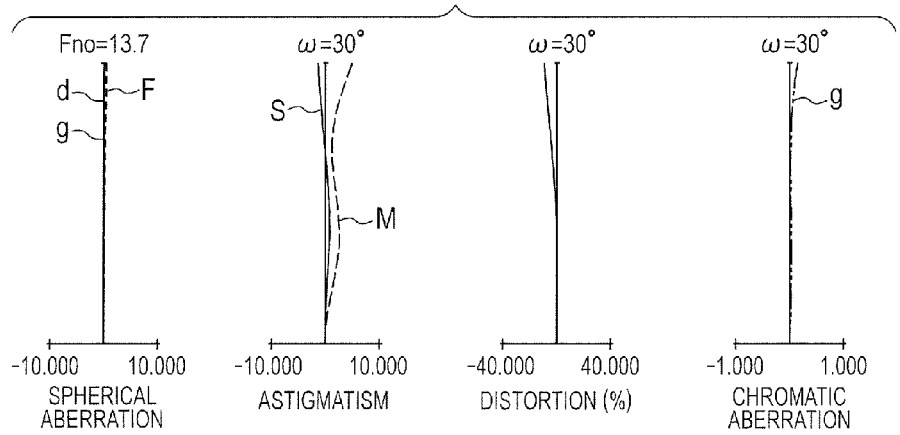

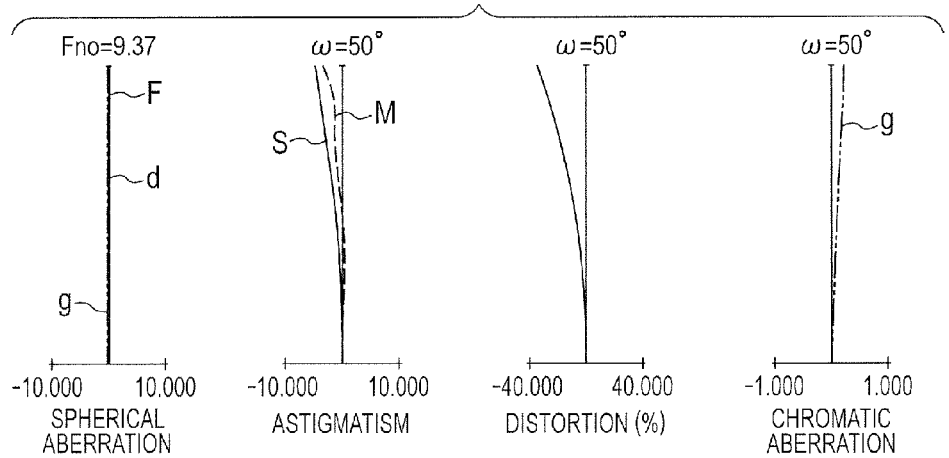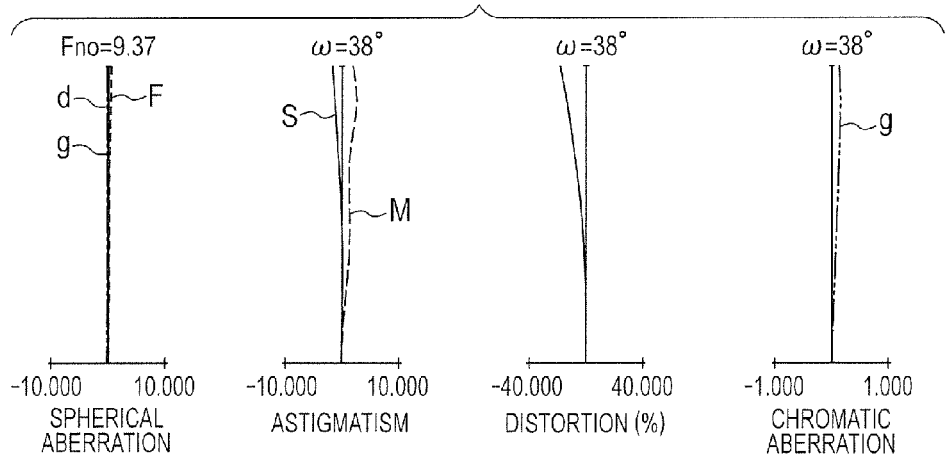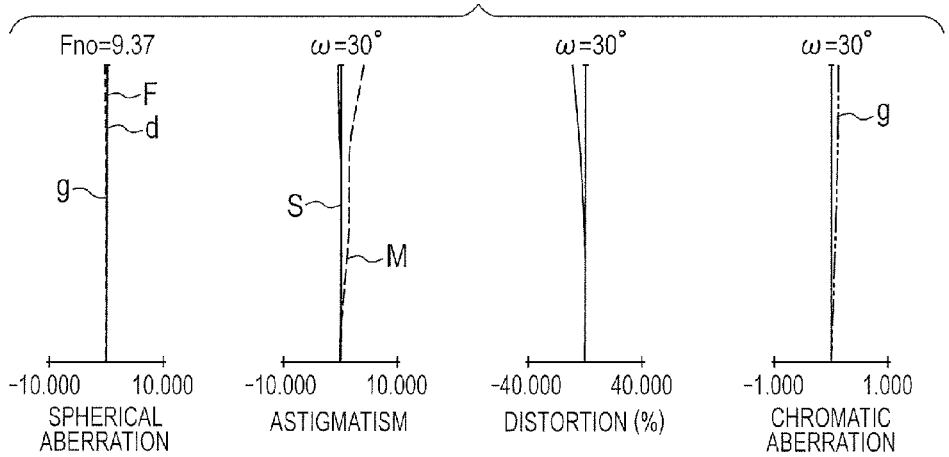

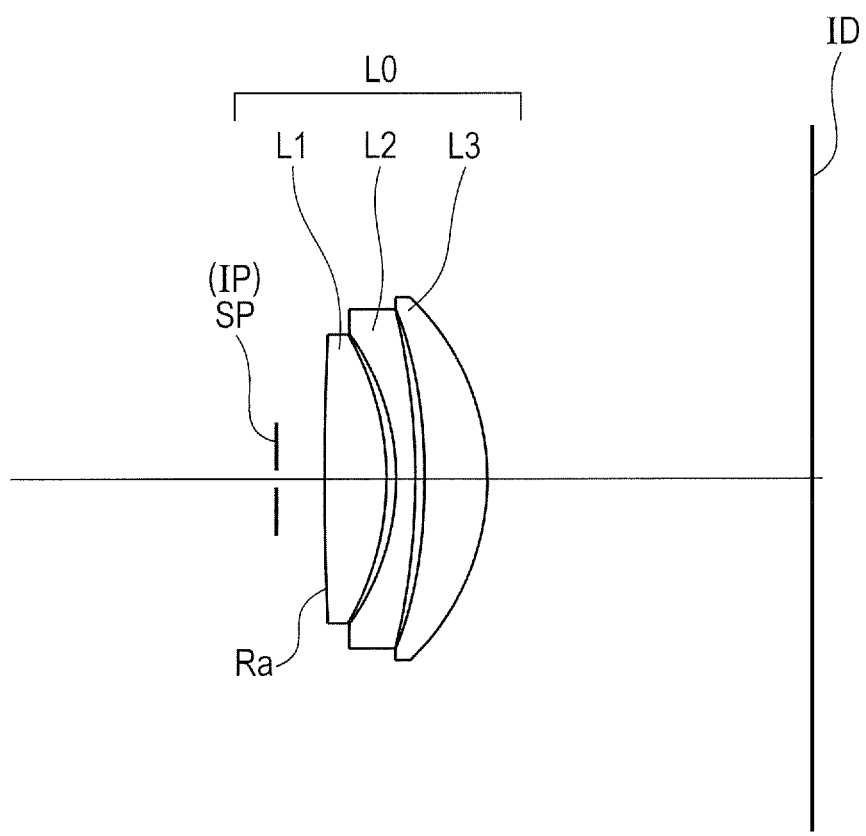

PUPIL NORMAL VIEW STATE

PUPIL ROTATING STATE

OBSERVATION OPTICAL SYSTEM, AND IMAGE DISPLAYING APPARATUS HAVING THE SAME

BACKGROUND OF THE INVENTION

Field of the Invention

The present invention relates to an observation optical system suitable for an image displaying apparatus such as a head mount display, which enlarges image information displayed on an image display surface of an image display element and provides the enlarged image information to an observer.

Description of the Related Art

Conventionally, an image displaying apparatus (head mount display or the like) is known which enlarges and displays image information that has been displayed with the use of the image display element such as CRT and LCD, through an observation optical system, and provides the realism of a picture to the observer. In recent years, it is desired for the image displaying apparatus which provides the realism to provide further high realism, and for this reason, an observation optical system which is used for the image displaying apparatus is required to correspond to a wide viewing angle and to have high optical performance.

In addition, eye reliefs vary depending on each of the shape of a face of a user which mounts the image displaying apparatus, whether the user wears glasses or not, and the like, and accordingly it is desired to cause little variation of aberration even when the eye relief has changed. In order that the observation optical system has the high optical performance while having a wide field of view and reduces the variation of aberration even when the eye relief has changed, it is necessary to appropriately set each of the lenses which constitute the observation optical system.

U.S. Pat. No. 7,738,179 discloses an observation optical system which includes, in order from an observation side that is an eye point side: a first lens having a positive refractive power; a second lens having a positive refractive power; a third lens having a positive refractive power; and a fourth lens having a negative refractive power, wherein the third lens and the fourth lens are cemented together. The observation optical system in U.S. Pat. No. 7,738,179 corrects chromatic aberration by using the cemented lens. However, the whole system is a strong telephoto type when viewed from the observation side, and the observation optical system has such a configuration of lenses as to strongly bend a peripheral light flux incident from the observation side to an optical axis direction and then strongly flip up the bent light flux up to the periphery of a screen. Because of this, the observation optical system has tended to increase field curvature and astigmatism in a wide field of view portion, and to impair the realism at the time when a pupil has been rotated. In addition, the observation optical system has a large refractive power of a lens at a position at which an incidence height of the peripheral light flux is high, and has tended to increase the variation of the field curvature and the astigmatism when the eye relief has changed.

U.S. Pat. No. 9,104,019 discloses an observation optical system which includes, in order from an observation side: a first lens having a positive refractive power; and a second lens having a positive refractive power. The observation optical system in U.S. Pat. No. 9,104,019 is formed of two lenses, and reduces the weight of the whole system. However, the observation optical system in U.S. Pat. No. 9,104,019 does not necessarily sufficiently correct the lateral chromatic aberration and the field curvature, and also has tended to impair the realism at the time when the eye has rotated.

SUMMARY OF THE INVENTION

An object of the present invention is to provide: an observation optical system which has high optical performance while having a wide field of view, and easily reduces variation of aberration at the time when an eye relief changes; and an image displaying apparatus having the same.

The observation optical system according to the present invention is an observation optical system for observation of an image displayed on an image display surface, and includes, in order from an observation side to an image displaying surface side: a first lens having a positive refractive power; a second lens having a negative refractive power; and a third lens having a positive refractive power, wherein when a focal length of the first lens is represented by f1, a focal length of the second lens is represented by f2, and a focal length of the third lens is represented by f3, the following conditional expression is satisfied, $$0.40 < \frac{f1}{\sqrt{-f2 \times f3}} < 0.80.$$

Further features of the present invention will become apparent from the following description of exemplary embodiments with reference to the attached drawings.

BRIEF DESCRIPTION OF THE DRAWINGS

FIG. 2A is a view of longitudinal aberration in a normal view when an eye relief is set at 10 mm, in Exemplary Embodiment 1 of the present invention.

FIG. 2B is a view of longitudinal aberration in the normal view when the eye relief is set at 20 mm, in Exemplary Embodiment 1 of the present invention.

FIG. 2C is a view of longitudinal aberration in the normal view when the eye relief is set at 26 mm, in Exemplary Embodiment 1 of the present invention.

FIG. 5A is a view of longitudinal aberration in a normal view when an eye relief is set at 10 mm, in Exemplary Embodiment 2 of the present invention.

FIG. 5B is a view of longitudinal aberration in the normal view when the eye relief is set at 20 mm, in Exemplary Embodiment 2 of the present invention.

FIG. 5C is a view of longitudinal aberration in the normal view when the eye relief is set at 26 mm, in Exemplary Embodiment 2 of the present invention.

FIG. 8A is a view of longitudinal aberration in a normal view when an eye relief is set at 10 mm, in Exemplary Embodiment 3 of the present invention.

FIG. 8B is a view of longitudinal aberration in the normal view when the eye relief is set at 20 mm, in Exemplary Embodiment 3 of the present invention.

FIG. 8C is a view of longitudinal aberration in the normal view when the eye relief is set at 26 mm, in Exemplary Embodiment 3 of the present invention.

FIG. 10 is a sectional view of lenses in Exemplary Embodiment 4 of the present invention.

DESCRIPTION OF THE EMBODIMENTS

Favorable embodiments of the present invention will be described in detail below, with reference to the attached drawings. An observation optical system according to the present invention is used when an observer observes an image which is displayed on an image display surface of a display panel (image display element) formed of a liquid crystal, an organic EL or the like, in an image displaying apparatus, for instance, such as a head mount display. In addition, the observation optical system in each of the exemplary embodiments may be used for an electronic view finder of an imaging apparatus such as a digital camera and a video camera. The observation optical system includes, in order from an observation side to an image displaying surface side: a first lens having a positive refractive power; a second lens having a negative refractive power; and a third lens having a positive refractive power.

An image displaying apparatus according to the present invention has an observation optical system, and an image display element which displays image information, and enlarges the image information by the observation optical system. An observer observes the enlarged image information through the observation optical system.

Figure 1:
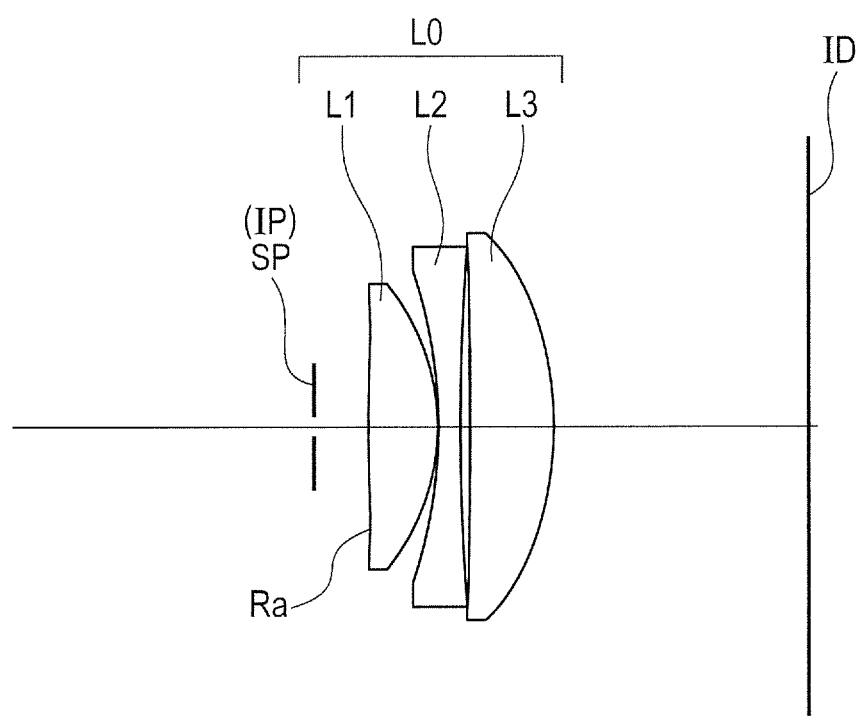
FIG. 1 is a sectional view of lenses in Exemplary Embodiment 1 of the present invention.
Figure 3A:
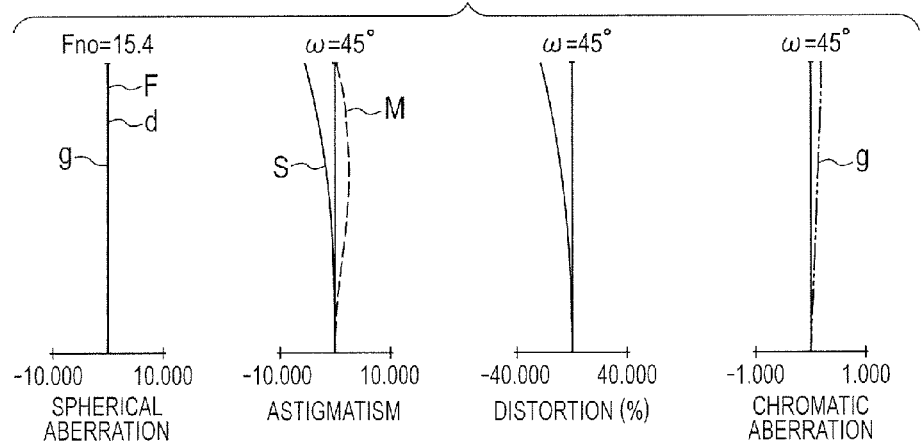
FIG. 3A is a view of longitudinal aberration in a pupil rotation center when the eye relief is set at 10 mm, in Exemplary Embodiment 1 of the present invention.
Figure 3B:
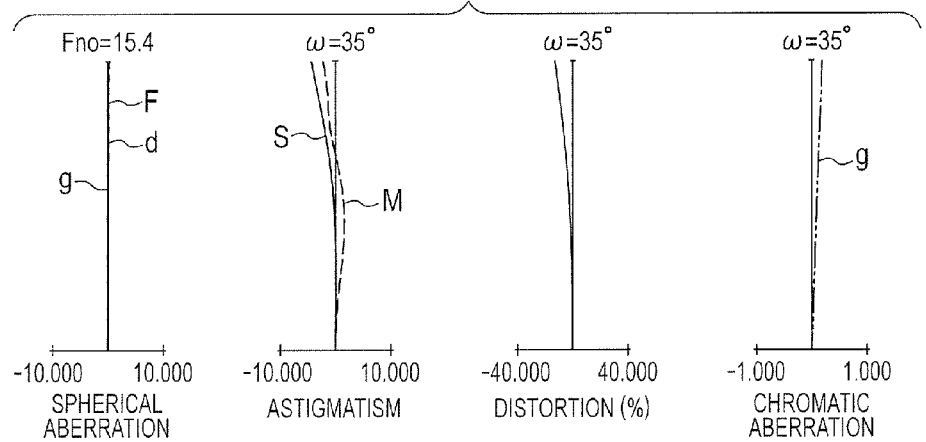
FIG. 3B is a view of longitudinal aberration in the pupil rotation center when the eye relief is set at 20 mm, in Exemplary Embodiment 1 of the present invention.
Figure 3C:
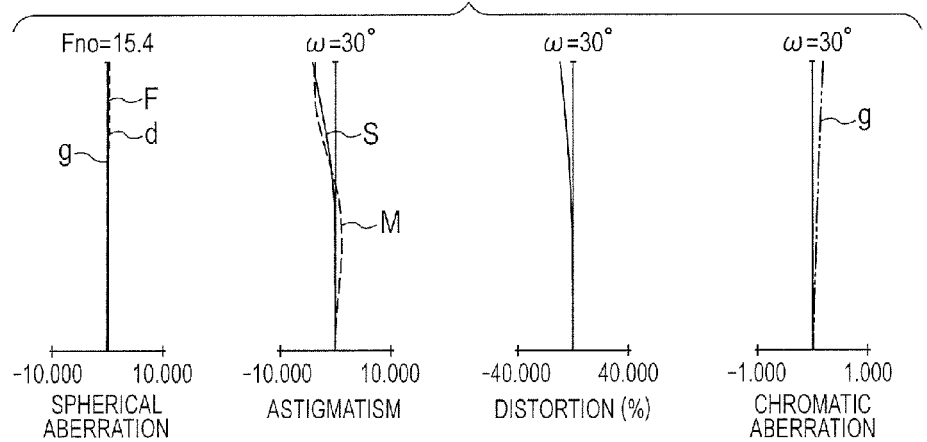
FIG. 3C is a view of longitudinal aberration in the pupil rotation center when the eye relief is set at 26 mm, in Exemplary Embodiment 1 of the present invention.

FIG. 1 is a sectional view of lenses, which illustrates a configuration of lenses in an observation optical system, in Exemplary Embodiment 1 of the present invention. FIGS. 2A, 2B and 2C are views of longitudinal aberrations in a normal view when an eye relief is set at 10 mm, the normal view when the eye relief is set at 20 mm, and the normal view when the eye relief is set at 26 mm, respectively, in the observation optical system of Exemplary Embodiment 1 of the present invention. FIGS. 3A, 3B and 3C are views of longitudinal aberrations in a pupil rotation center when the eye relief is set at 10 mm, the pupil rotation center when the eye relief is set at 20 mm and the pupil rotation center when the eye relief is set at 26 mm, respectively, in the observation optical system of Exemplary Embodiment 1 of the present invention.

Figure 4:
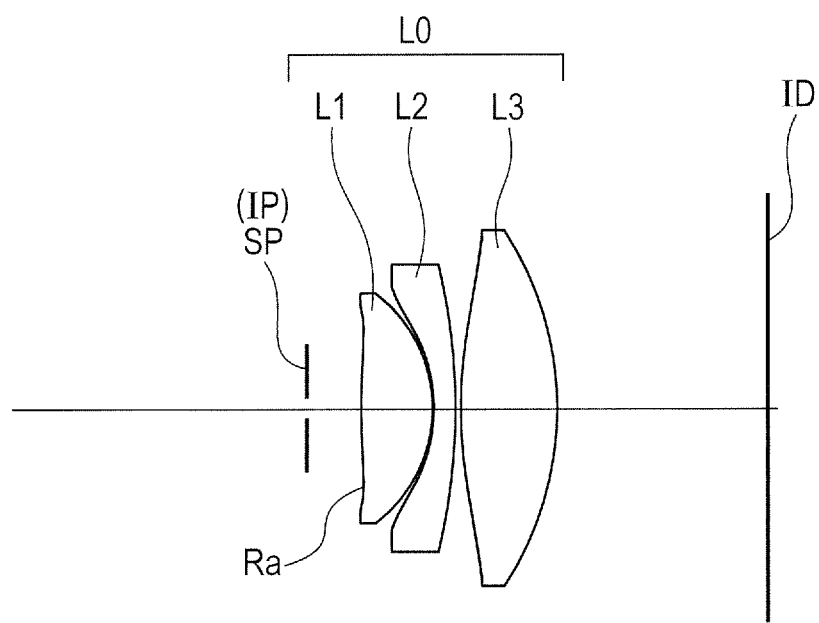
FIG. 4 is a sectional view of lenses in Exemplary Embodiment 2 of the present invention.
Figure 6A:
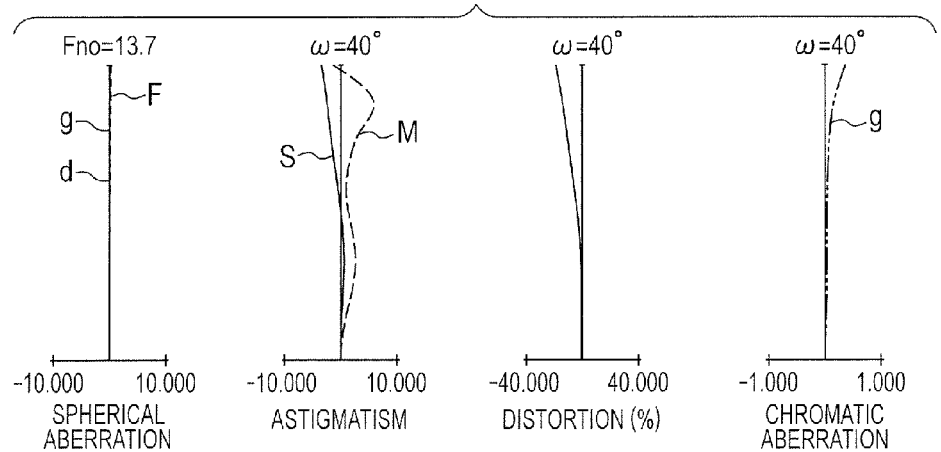
FIG. 6A is a view of longitudinal aberration in a pupil rotation center when the eye relief is set at 10 mm, in Exemplary Embodiment 2 of the present invention.
Figure 6B:
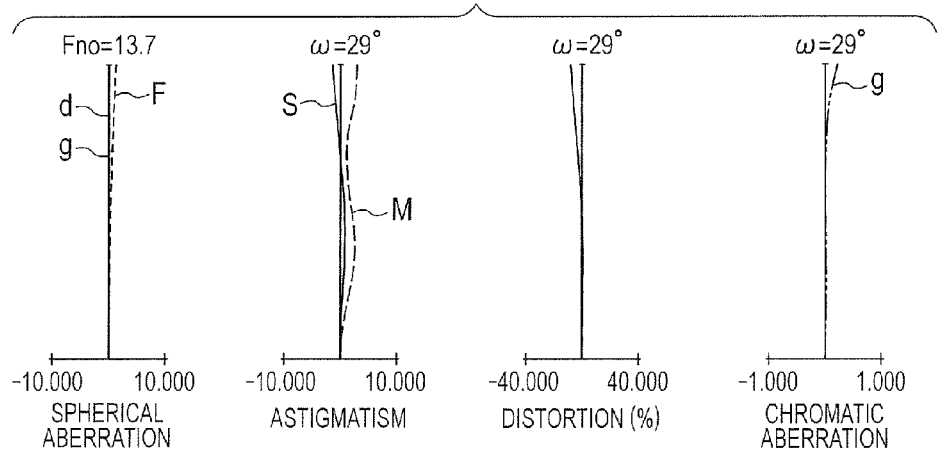
FIG. 6B is a view of longitudinal aberration in the pupil rotation center when the eye relief is set at 20 mm, in Exemplary Embodiment 2 of the present invention.
Figure 6C:
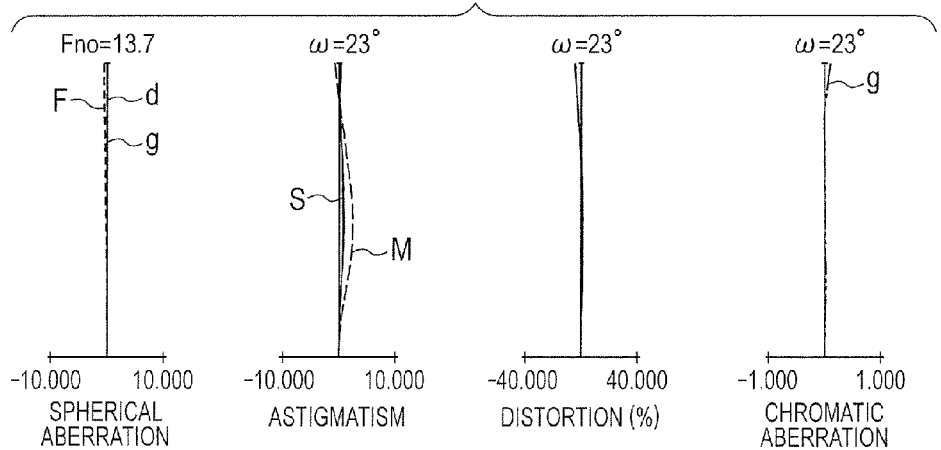
FIG. 6C is a view of longitudinal aberration in the pupil rotation center when the eye relief is set at 26 mm, in Exemplary Embodiment 2 of the present invention.

FIG. 4 is a sectional view of lenses, which illustrates a configuration of lenses in an observation optical system, in Exemplary Embodiment 2 of the present invention. FIGS. 5A, 5B and 5C are views of longitudinal aberrations in a normal view when an eye relief is set at 10 mm, the normal view when the eye relief is set at 20 mm, and the normal view when the eye relief is set at 26 mm, respectively, in the observation optical system of Exemplary Embodiment 2 of the present invention. FIGS. 6A, 6B and 6C are views of longitudinal aberrations in a pupil rotation center when the eye relief is set at 10 mm, the pupil rotation center when the eye relief is set at 20 mm and the pupil rotation center when the eye relief is set at 26 mm, respectively, in the observation optical system of Exemplary Embodiment 2 of the present invention.

Figure 7:
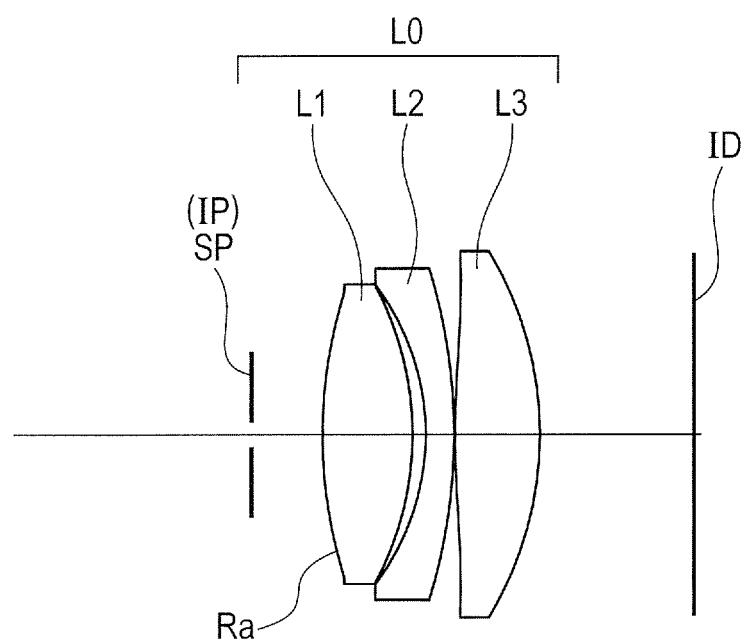
FIG. 7 is a sectional view of lenses in Exemplary Embodiment 3 of the present invention.
Figure 9A:
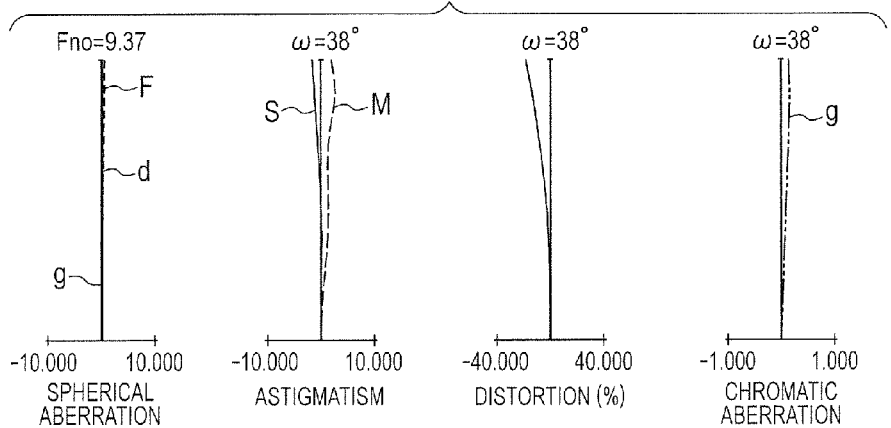
FIG. 9A is a view of longitudinal aberration in a pupil rotation center when the eye relief is set at 10 mm, in Exemplary Embodiment 3 of the present invention.
Figure 9B:
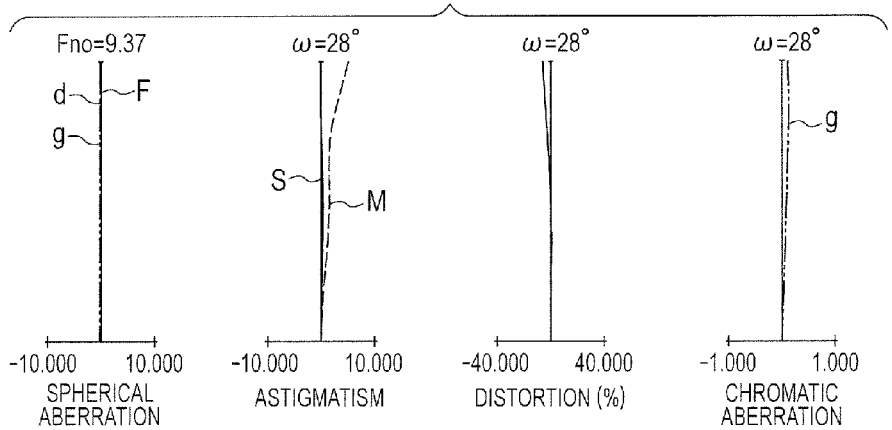
FIG. 9B is a view of longitudinal aberration in the pupil rotation center when the eye relief is set at 20 mm, in Exemplary Embodiment 3 of the present invention.
Figure 9C:
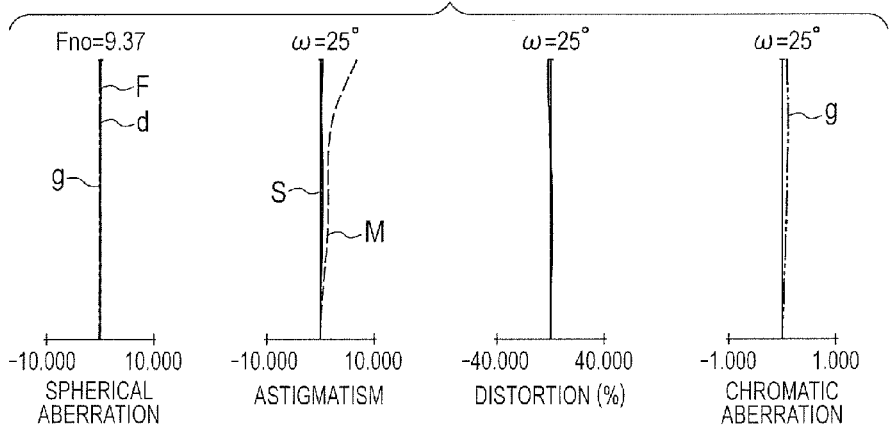
FIG. 9C is a view of longitudinal aberration in the pupil rotation center when the eye relief is set at 26 mm, in Exemplary Embodiment 3 of the present invention.

FIG. 7 is a sectional view of lenses, which illustrates a configuration of lenses in an observation optical system, in Exemplary Embodiment 3 of the present invention. FIGS. 8A, 8B and 8C are views of longitudinal aberrations in a normal view when an eye relief is set at 10 mm, the normal view when the eye relief is set at 20 mm, and the normal view when the eye relief is set at 26 mm, respectively, in the observation optical system of Exemplary Embodiment 3 of the present invention. FIGS. 9A, 9B and 9C are views of longitudinal aberrations in a pupil rotation center when the eye relief is set at 10 mm, the pupil rotation center when the eye relief is set at 20 mm and the pupil rotation center when the eye relief is set at 26 mm, respectively, in the observation optical system of Exemplary Embodiment 3 of the present invention.

Figure 11A:
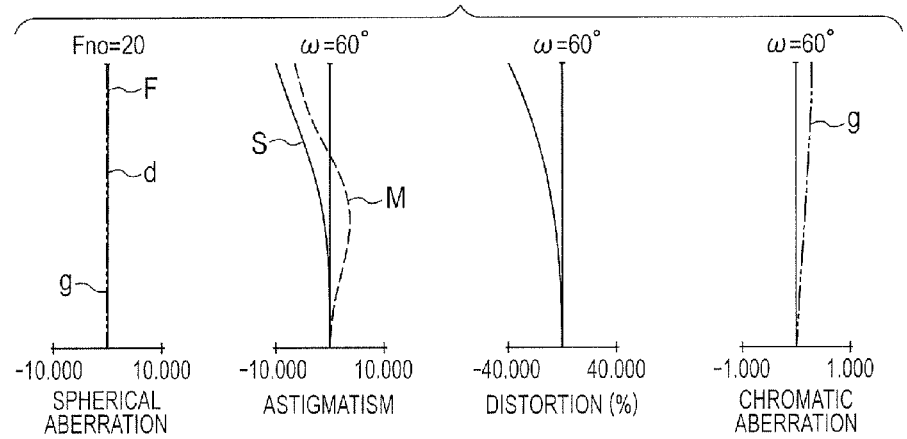
FIG. 11A is a view of longitudinal aberration in a normal view when an eye relief is set at 10 mm, in Exemplary Embodiment 4 of the present invention.
Figure 11B:
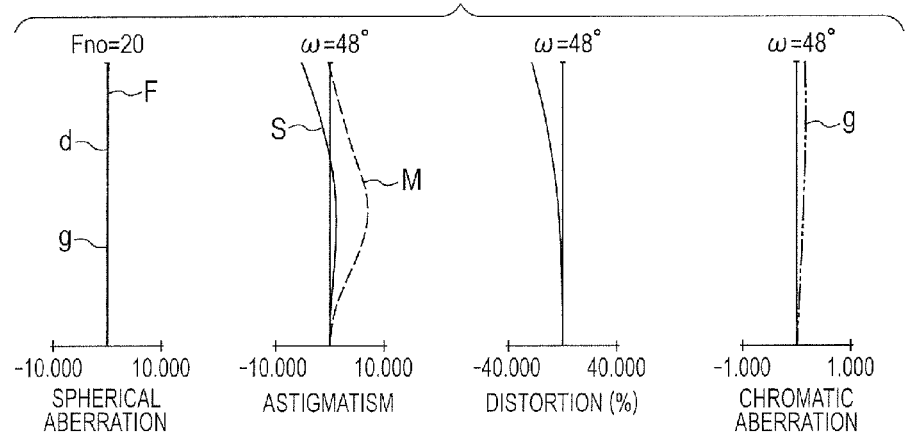
FIG. 11B is a view of longitudinal aberration in the normal view when the eye relief is set at 20 mm, in Exemplary Embodiment 4 of the present invention.
Figure 11C:
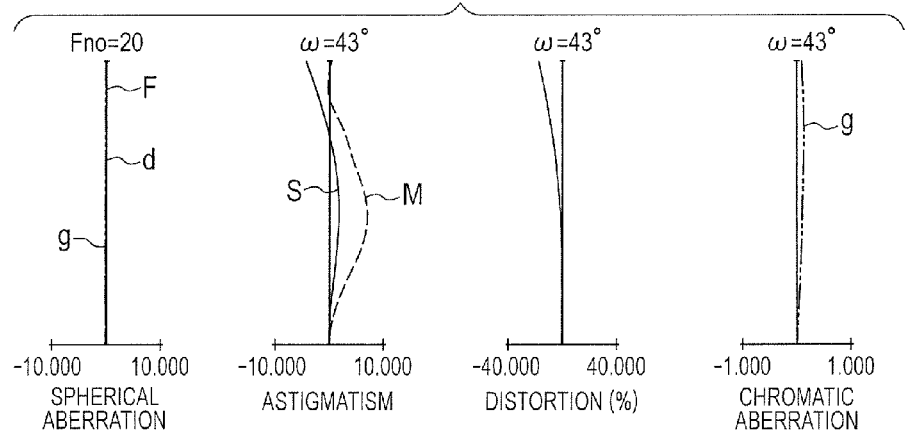
FIG. 11C is a view of longitudinal aberration in the normal view when the eye relief is set at 26 mm, in Exemplary Embodiment 4 of the present invention.
Figure 12A:
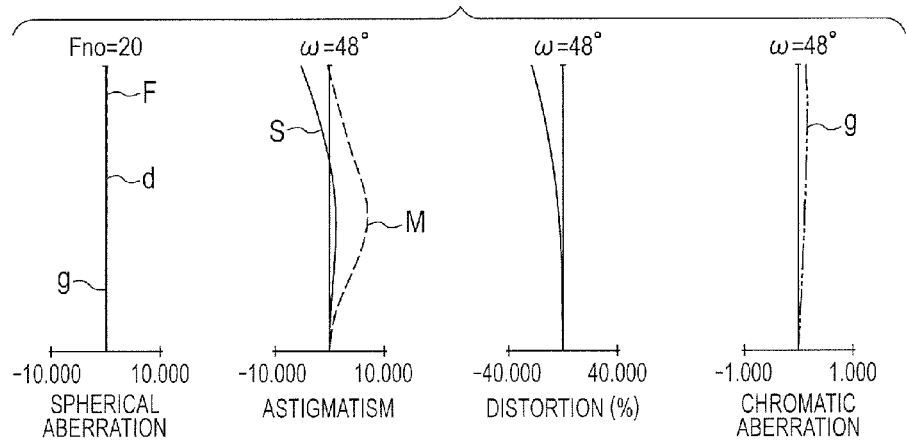
FIG. 12A is a view of longitudinal aberration in a pupil rotation center when the eye relief is set at 10 mm, in Exemplary Embodiment 4 of the present invention.
Figure 12B:
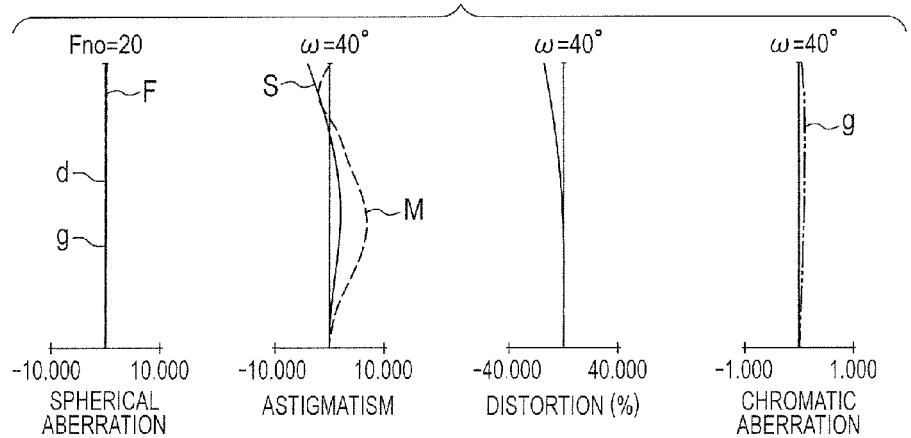
FIG. 12B is a view of longitudinal aberration in the pupil rotation center when the eye relief is set at 20 mm, in Exemplary Embodiment 4 of the present invention.
Figure 12C:
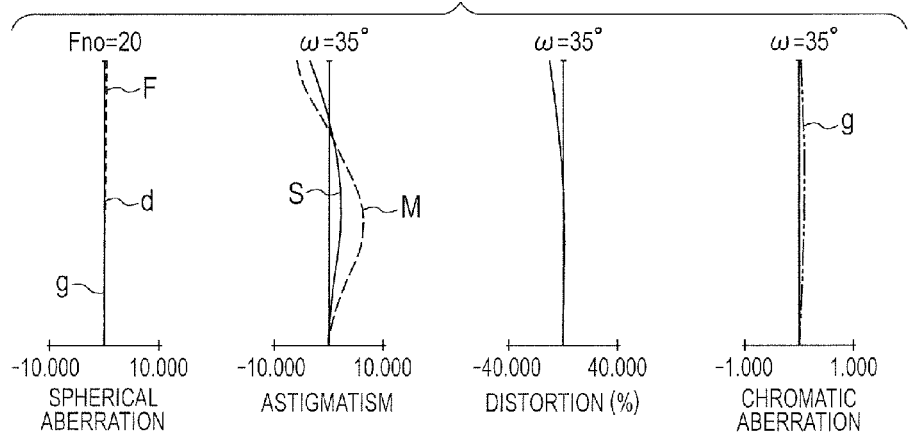
FIG. 12C is a view of longitudinal aberration in the pupil rotation center when the eye relief is set at 26 mm, in Exemplary Embodiment 4 of the present invention.

FIG. 10 is a sectional view of lenses, which illustrates a configuration of lenses in an observation optical system, in Exemplary Embodiment 4 of the present invention. FIGS. 11A, 11B and 11C are views of longitudinal aberrations in a normal view when an eye relief is set at 10 mm, the normal view when the eye relief is set at 20 mm, and the normal view when the eye relief is set at 26 mm, respectively, in the observation optical system of Exemplary Embodiment 4 of the present invention. FIGS. 12A, 12B and 12C are views of longitudinal aberrations in a pupil rotation center when the eye relief is set at 10 mm, the pupil rotation center when the eye relief is set at 20 mm and the pupil rotation center when the eye relief is set at 26 mm, respectively, in the observation optical system of Exemplary Embodiment 4 of the present invention.

Figure 13:
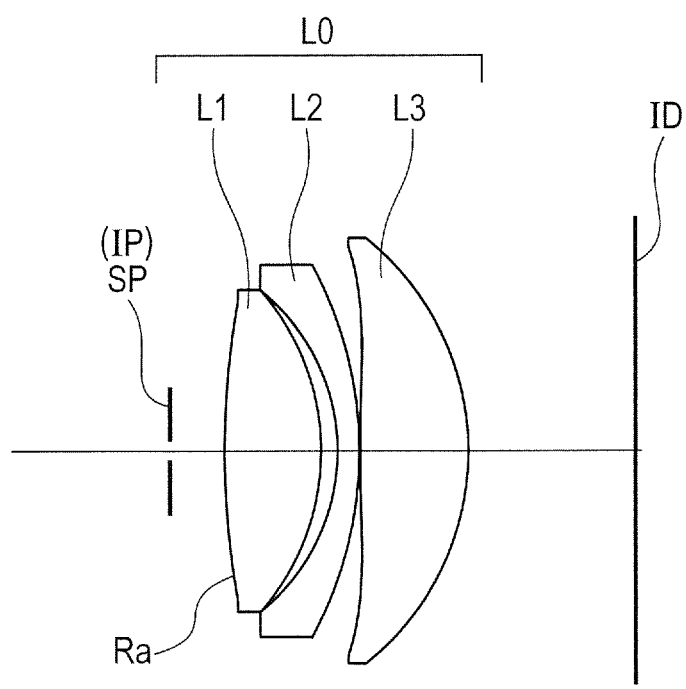
FIG. 13 is a sectional view of lenses in Exemplary Embodiment 5 of the present invention.
Figure 14A:
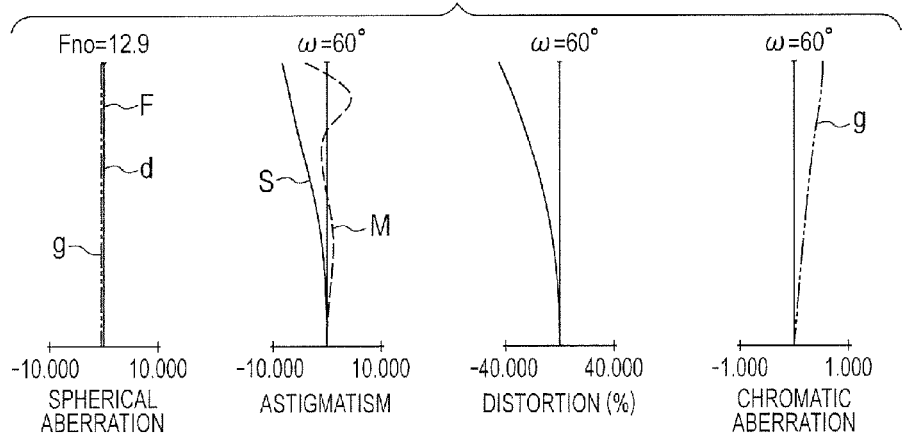
FIG. 14A is a view of longitudinal aberration in a normal view when an eye relief is set at 10 mm, in Exemplary Embodiment 5 of the present invention.
Figure 14B:
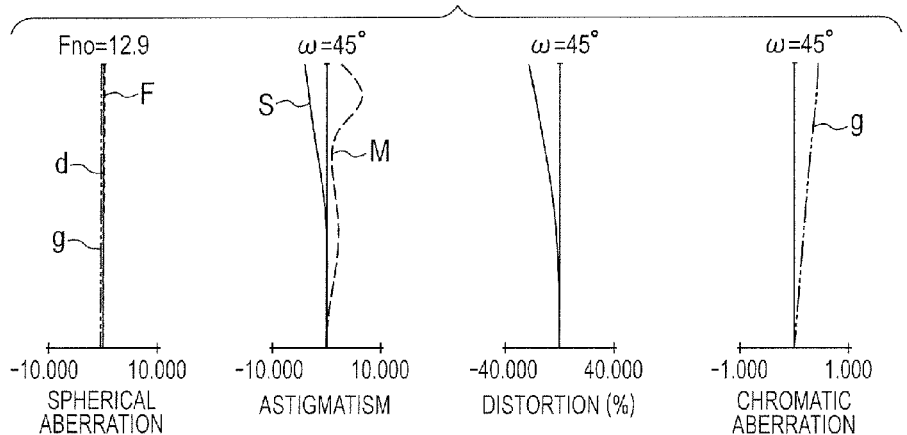
FIG. 14B is a view of longitudinal aberration in the normal view when the eye relief is set at 20 mm, in Exemplary Embodiment 5 of the present invention.
Figure 14C:
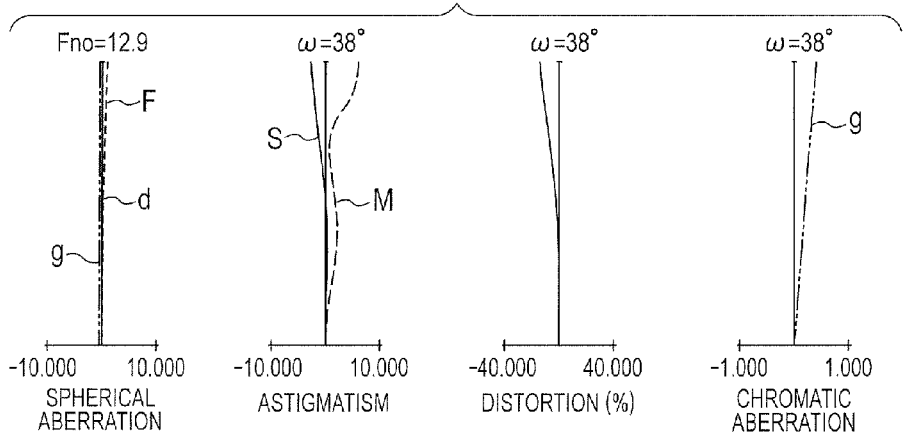
FIG. 14C is a view of longitudinal aberration in the normal view when the eye relief is set at 26 mm, in Exemplary Embodiment 5 of the present invention.
Figure 15A:
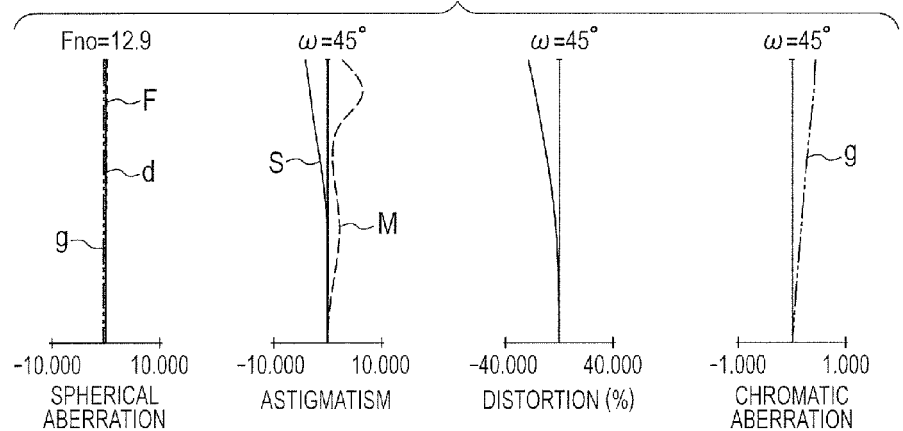
FIG. 15A is a view of longitudinal aberration in a pupil rotation center when the eye relief is set at 10 mm, in Exemplary Embodiment 5 of the present invention.
Figure 15B:
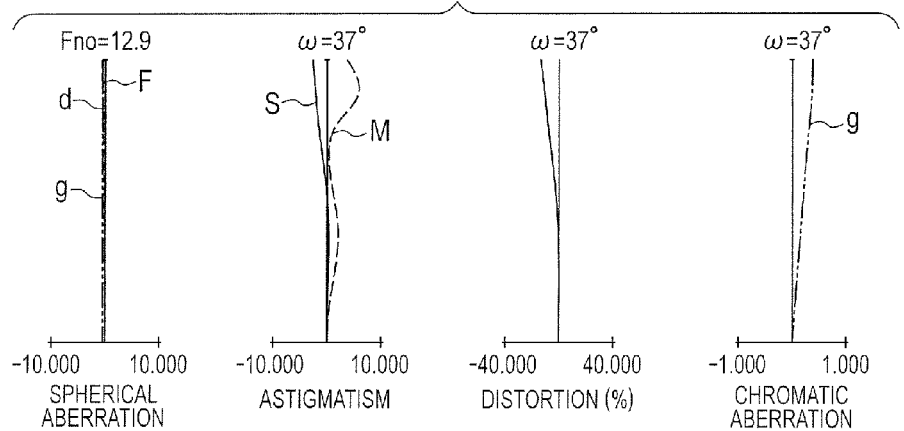
FIG. 15B is a view of longitudinal aberration in the pupil rotation center when the eye relief is set at 20 mm, in Exemplary Embodiment 5 of the present invention.
Figure 15C:
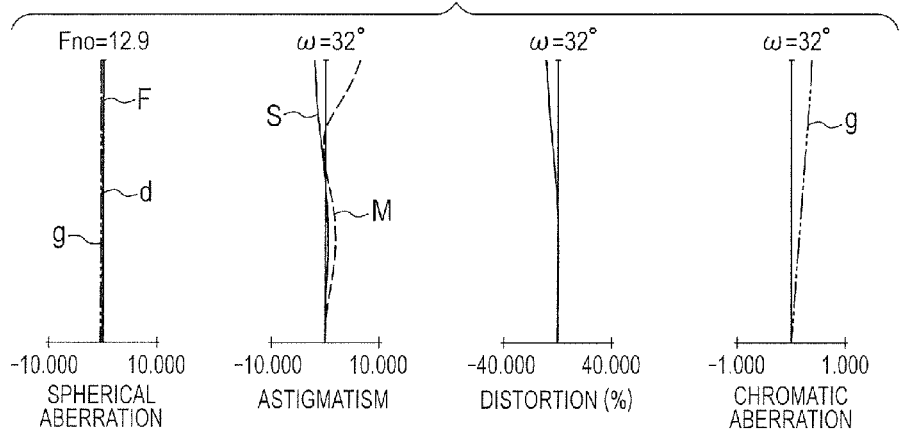
FIG. 15C is a view of longitudinal aberration in the pupil rotation center when the eye relief is set at 26 mm, in Exemplary Embodiment 5 of the present invention.

FIG. 13 is a sectional view of lenses, which illustrates a configuration of lenses in an observation optical system, in Exemplary Embodiment 5 of the present invention. FIGS. 14A, 14B and 14C are views of longitudinal aberrations in a normal view when an eye relief is set at 10 mm, the normal view when the eye relief is set at 20 mm, and the normal view when the eye relief is set at 26 mm, respectively, in the observation optical system of Exemplary Embodiment 5 of the present invention. FIGS. 15A, 15B and 15C are views of longitudinal aberrations in a pupil rotation center when the eye relief is set at 10 mm, the pupil rotation center when the eye relief is set at 20 mm and the pupil rotation center when the eye relief is set at 26 mm, respectively, in the observation optical system of Exemplary Embodiment 5 of the present invention.

Figure 16:
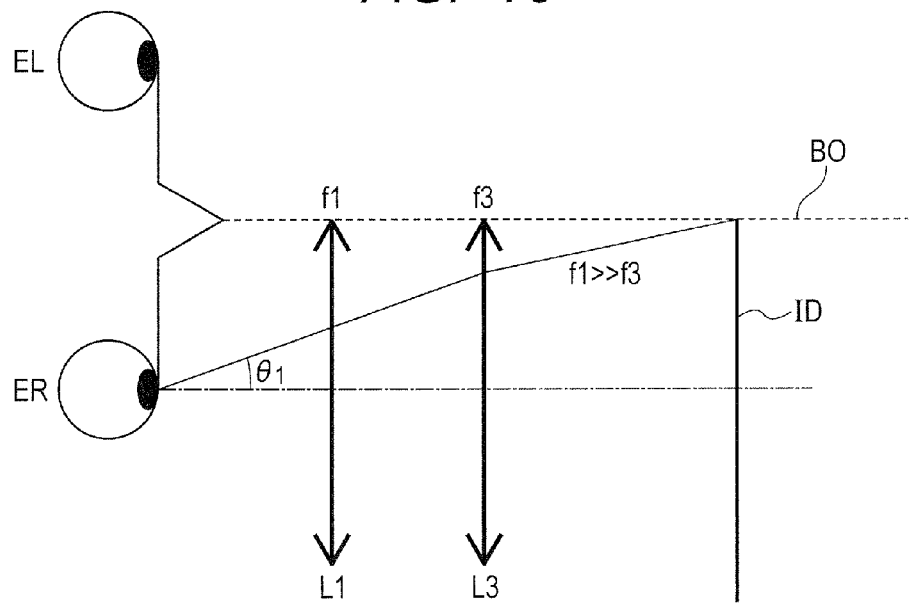
FIG. 16 is an explanatory view of a state in which an inner viewing angle is trimmed.
Figure 17:
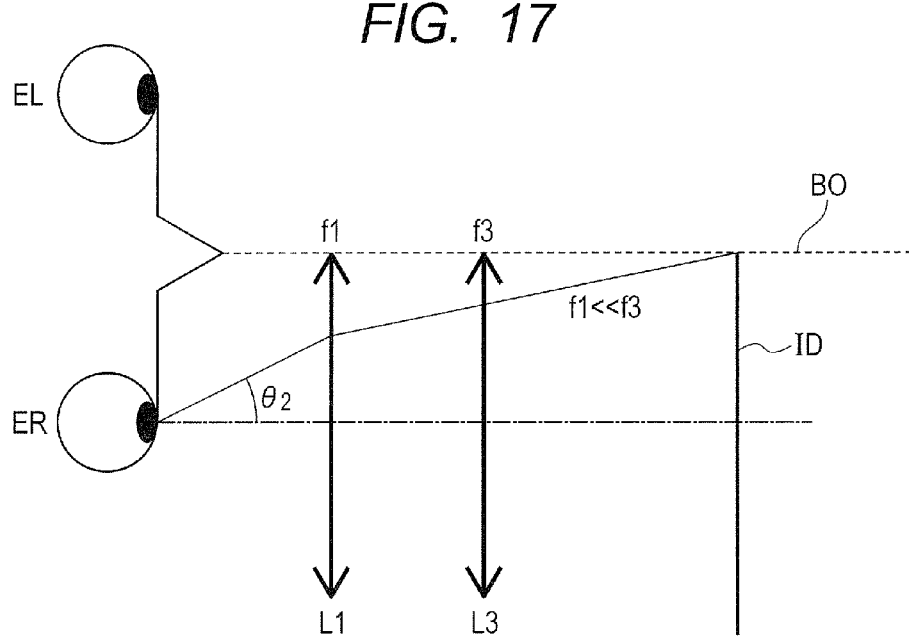
FIG. 17 is an explanatory view of a state in which the inner viewing angle is ensured.
Figure 18A:
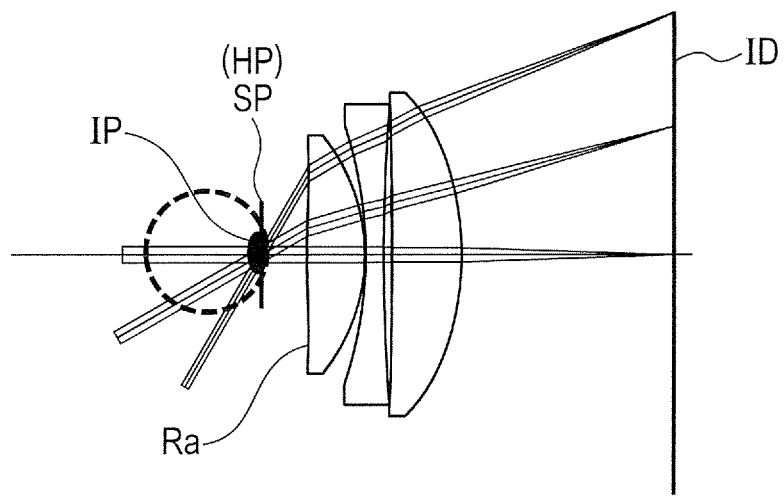
FIG. 18A is an explanatory view of a performance evaluation method in a pupil normal view state of the present invention.
Figure 18B:
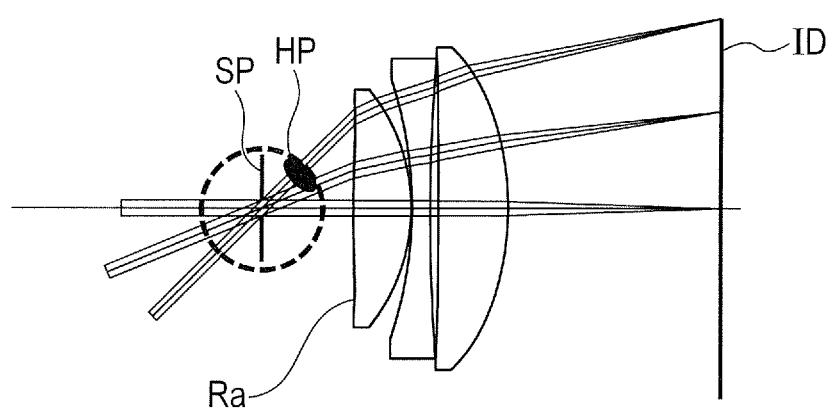
FIG. 18B is an explanatory view of a performance evaluation method in a pupil rotating state of the present invention.

FIG. 16 is an explanatory view of a state in which an inner viewing angle is trimmed. FIG. 17 is an explanatory view of a state in which the inner viewing angle is ensured. FIGS. 18A and 18B are explanatory views of evaluations of optical performances in a pupil normal view state and a pupil rotating state, respectively.

In each of the sectional views of lenses, a right side is a display panel side (image displaying surface side), and a left side is an observation side (exit pupil side) (eye point side). In each of the sectional views of lenses, L0 is an observation optical system. IP is an eye point (exit pupil) for observation. ID is a display panel (image display surface) which is formed of a liquid crystal, an organic EL or the like. L1 is a first lens having a positive refractive power, L2 is a second lens having a negative refractive power, and L3 is a third lens having a positive refractive power.

In a view of spherical aberration among the views of aberration, d represents a d-line (wavelength of 587.6 nm), g represents a g-line (wavelength of 435.8 nm), and F represents an F-line (wavelength of 486.1 nm). In the view of the astigmatism, S represents a sagittal image plane of the d-line, and M represents a meridional image plane of the d-line. The lateral chromatic aberration is shown by the g-line.

Next, the observation optical system in each of the exemplary embodiments will be described below. In the sectional view of the lens in each of the exemplary embodiments, SP represents an aperture stop. A display element such as LCD is arranged on an image display surface ID. Here, the eye relief means a distance between an eye point IP and a lens surface Ra which is closest to the eye point side, on an optical axis. Incidentally, as for the evaluation of the aberration, aberration in the eye point IP side occurring when a light flux has been emitted from the image display surface ID and aberration on the image display surface ID occurring when a light flux has been emitted from the eye point IP side correspond to each other in a one-to-one relationship, and accordingly the aberration on the image display surface ID is evaluated for convenience.

As for the aberration evaluation method, there are two methods which are a pupil normal view state as in FIG. 18A, and a pupil rotating state as in FIG. 18B. The pupil normal view state in FIG. 18A shows a state in which optical performances in the center and the periphery in the case where a gaze direction is on the optical axis are evaluated, and the equivalent state can be reproduced by arranging the aperture stop SP on the eye point IP. The pupil rotating state in FIG. 18B shows a state in which the optical performance of the center in the gaze direction in the case where the pupil HP is rotated is evaluated. The equivalent state can be reproduced by arranging the aperture stop SP in the center of rotation of the pupil HP (in present exemplary embodiment, as example, at position further 10 mm separated on optical axis from position of eye point IP, from lens which is closest to eye point side).

In addition, the diameter of the aperture of the aperture stop SP in the present exemplary embodiment is set at 3.5 mm as one example of the pupil diameter of a human, but the diameter of the aperture of the aperture stop SP at the time of design is set at 10 mm or more in consideration of the rotation or the position deviation of the pupil HP.

The observation optical system L0 in each of the exemplary embodiments includes, in order from an observation side: a first lens L1 having a positive refractive power; a second lens L2 having a negative refractive power; and a third lens L3 having a positive refractive power. A focal length of the first lens L1 shall be represented by f1, a focal length of the second lens L2 shall be represented by f2, and a focal length of the third lens L3 shall be represented by f3. At this time, the following conditional expression (1) is satisfied.

$$0.40 < \frac{f1}{\sqrt{-f2 \times f3}} < 0.80 \quad (1)$$

The observation optical system L0 in each of the exemplary embodiments is a triplet type in which a positive lens, a negative lens and a positive lens are arranged from an observation side (eye point IP side). Thereby, a peripheral light flux is mildly bent, a field curvature and an astigmatism, in particular, can be adequately corrected, and an observer can observe an image which does not impair the realism even when pupil has been rotated. The lenses are characterized in that the conditional expression (1) is satisfied.

The conditional expression (1) is set so that the observation optical system has a high optical performance, and reduces the variation of the optical performance at the time when the eye relief changes. The conditional expression (1) relates to a ratio of the focal length of the first lens L1 to a square root of a product of the focal length of the second lens L2 and the focal length of the third lens L3. The conditional expression (1) shortens the focal length of the first lens L1 in an appropriate range with respect to the focal lengths of the second lens L2 and the third lens L3, and thereby enlarges the share of the power (refractive power) of the first lens L1 which is positioned in the closest side to the eye point IP.

As the lens is closer to the eye point IP, a height of a peripheral light flux from an optical axis becomes lower, and occurrence of the field curvature and the astigmatism due to refraction becomes small. The observation optical system L0 has a feature that the first lens L1 is always closest to the eye point IP even when the eye relief has changed, and accordingly reduces the increase of the field curvature and the astigmatism at the time when the eye relief has changed, by enlarging the power share of the first lens L1. Furthermore, the positive refractive power of the first lens L1 is strengthen, compared to the positive refractive power of the third lens L3, and thereby the viewing angle increases.

Next, the above reason will be described below with reference to FIG. 16 and FIG. 17. In FIG. 16 and FIG. 17, only the first lens L1 having the positive refractive power and the third lens L3 having the positive refractive power are described for convenience, and only a principal ray is described.

In the present invention, a structure is assumed, for instance, in which separate optical systems corresponding to left and right eyes, respectively, and a panel ID are prepared, and different images to which parallax has been given are observed. In this case, the structure is considered in which, for instance, a blocking object BO is provided in the center so that a display image for a right eye ER does not enter a left eye EL (and display image for left eye EL does not enter right eye ER) (In addition, a method of coating the lens or the like is also considered).

As a result, a viewing angle in the inside results in being restricted by the blocking object BO. It shall be assumed that a condition on which the equivalent light quantity is obtained from the panel ID, in other words, an angle emitted from the panel ID to the third lens L3 is equivalent. As is illustrated in FIG. 16, as the refractive power of the third lens L3 having the positive refractive power (inverse number of focal length of third lens L3) is strong compared to the refractive power of the first lens L1 having the positive refractive power (inverse number of focal length of first lens group L1), an inside incident angle θ1 on the pupil (hereafter referred to as inside viewing angle) is small.

On the other hand, as the refractive power of the first lens L1 having the positive refractive power is strong compared to the refractive power of the third lens L3 having the positive refractive power as in FIG. 17, the inside incident angle θ2 on the pupil (hereinafter referred to as inside viewing angle) is large.

According to the above description, the positive refractive power of the first lens L1 is strengthen, compared to the refractive power of the third lens L3, and thereby the inside viewing angle increases.

When the ratio falls below the lower limit in the conditional expression (1), the positive refractive power of the first lens L1 deviates from an appropriate range and becomes excessively strong, and much field curvature and astigmatism result in occurring regardless of the eye relief. In addition, when the ratio exceeds the upper limit in the conditional expression (1), the second lens L2 and the third lens L3 acquire excessively strong refractive powers, and strongly refract a peripheral light flux at a position at which an incidence height of the peripheral light flux is high. Accordingly, much field curvature and astigmatism result in occurring particularly in a state in which the eye relief is close. In addition, the refractive power of the first lens L1 becomes excessively weak, vignetting of a marginal light flux in the inside viewing angle increases, and the viewing angle substantially decreases.

It is further preferred that the following conditional expression (1a) is satisfied:

$$0.45 < \frac{f1}{\sqrt{-f2 \times f3}} < 0.77. \tag{1a}$$

It is still further preferred that the following conditional expression (1b) is satisfied:

$$0.49 < \frac{f1}{\sqrt{-f2 \times f3}} < 0.74. \tag{1b}$$

The observation optical system according to the above described structure has high optical performance while having a wide field of view, and can easily reduce variation of aberration at the time when an eye relief changes.

The observation optical system in each of the exemplary embodiments can further satisfy one or more of the following conditional expressions. A refractive index of a material of the first lens L1 shall be represented by N1, a refractive index of a material of the second lens shall be represented by N2, a refractive index of a material of the third lens L3 shall be represented by N3, and a focal length of the observation optical system shall be represented by f. A distance (air distance) on the optical axis between the first lens L1 and the second lens L2 shall be represented by d12.

A length (lens configuration length) on the optical axis from the lens surface in an observation side of the first lens L1 to the lens surface on the image displaying surface side of the third lens L3 shall be represented by dtotal. A distance (air distance) on the optical axis between the second lens L2 and the third lens L3 shall be represented by d23. A curvature radius of a lens surface in an observation side of the first lens L1 shall be represented by R11, and a curvature radius of a lens surface in an image displaying surface side of the first lens L1 shall be represented by R12.

A curvature radius of a lens surface in an observation side of the second lens L2 shall be represented by R21, and a curvature radius of a lens surface in an image displaying surface side of the second lens L2 shall be represented by R22. A curvature radius of a lens surface in an observation side of the third lens L3 shall be represented by R31, and a curvature radius of a lens surface in an image displaying surface side of the third lens L3 shall be represented by R32. An actual image height on an image displaying surface side when the eye relief is 10 mm and a half viewing angle is 50 degrees shall be represented by y, and an ideal image height on an image displaying surface side when the eye relief is 10 mm and the half viewing angle is 50 degrees shall be represented by y0.

At this time, the observation optical system in each of the exemplary embodiments may satisfy one or more of the following conditional expressions.

$$0.30 < f \times \{1/(f1 \times N1) + 1/(f2 \times N2) + 1/(f3 \times N3)\} < 0.80 \quad (2)$$

$$0.00 < d12/d\text{total} < 0.20 \quad (3)$$

$$0.00 < d23/d\text{total} < 0.20 \quad (4)$$

$$-1.00 < (R12+R11)/(R12-R11) < -0.10 \quad (5)$$

$$0.30 < (R22+R21)/(R22-R21) < 3.50 \quad (6)$$

$$-3.00 < (R32+R31)/(R32-R31) < -0.05 \quad (7)$$

$$-0.40 < (y-y0)/y0 < -0.20 \quad (8)$$

Next, a technical meaning of the above-described conditional expressions will be described below. The conditional expression (2) specifies a Petzval sum of the observation optical system L0. When the value of $f \times \{1/(f1 \times N1) + 1/(f2 \times N2) + 1/(f3 \times N3)\}$ falls below the lower limit in the conditional expression (2), the refractive index of the material of the second lens L2 having the negative refractive power is excessively low, and the curvature of the lens surface must be strengthened. Then, the astigmatism increases particularly in the state in which the eye relief is close. On the contrary, when the value of $f \times \{1/(f1 \times N1) + 1/(f2 \times N2) + 1/(f3 \times N3)\}$ exceeds the upper limit, the field curvature is excessively large, and a change of a diopter scale at the time when the pupil has been rotated becomes large. Then, it becomes difficult to obtain the high optical performance.

The conditional expression (3) relates to a ratio of a distance between the first lens L1 and the second lens L2 on the optical axis to the thickness (lens configuration length) of the whole system of the observation optical system L0. It cannot physically occur that the ratio falls below the lower limit in the conditional expression (3). When the ratio exceeds the upper limit in the conditional expression (3), the second lens L2 results in being arranged at a position at which the incidence height of the peripheral light flux is high, and excessively strongly flips up the peripheral light flux. Then, the astigmatism and the field curvature result in increasing particularly in the state in which the eye relief is close.

The conditional expression (4) relates to a ratio of a distance between the second lens L2 and the third lens L3 on the optical axis to the thickness of the whole system of the observation optical system L0. It cannot physically occur that the ratio falls below the lower limit in the conditional expression (4). When the ratio exceeds the upper limit in the conditional expression (4), the third lens L3 results in being arranged at a position at which the incidence height of the peripheral light flux is high, and excessively strongly refracts the peripheral light flux toward the optical axis direction. Then, the astigmatism and the field curvature result in increasing particularly in the state in which the eye relief is close.

The conditional expression (5) specifies a shape factor of the first lens L1 included in the observation optical system L0. When the curvature of the curvature radius of the lens surface in the image displaying surface side of the first lens L1 is excessively strong in such an extent as to fall below the lower limit of the conditional expression (5), the astigmatism increases regardless of the eye relief. On the contrary, when the curvature radius of the lens surface in the observation side of the first lens L1 is excessively strong in such an extent as to exceed the upper limit, the astigmatism increases regardless of the eye relief.

The conditional expression (6) specifies a shape factor of the second lens L2 included in the observation optical system L0. When the curvature of the curvature radius of the lens surface in the image displaying surface side of the second lens L2 is excessively strong in such an extent as to fall below the lower limit of the conditional expression (6), the astigmatism results in increasing particularly in the state in which the eye relief is close. On the contrary, when the curvature radius of the lens surface in the observation side of the second lens L2 is excessively strong in such an extent as to exceed the upper limit, the astigmatism results in increasing particularly in the state in which the eye relief is close.

The conditional expression (7) specifies a shape factor of the third lens L3 included in the observation optical system L0. When the curvature of the curvature radius of the lens surface in the image displaying surface side of the third lens L3 is excessively strong in such an extent as to falls below the lower limit of the conditional expression (7), the astigmatism results in increasing particularly in the state in which the eye relief is close. On the contrary, when the curvature radius of the lens surface in the observation side of the third lens L3 is excessively strong in such an extent as to exceed the upper limit, the astigmatism results in increasing particularly in the state in which the eye relief is close.

The conditional expression (8) specifies a distortion rate of the observation optical system L0. When the ratio falls below the lower limit in the conditional expression (8), the positive refractive power is excessively strong, and accordingly results in strongly bending the peripheral light flux toward the optical axis direction. Then, the field curvature and the astigmatism increase regardless of the eye relief. On the contrary, when the ratio exceeds the upper limit in the conditional expression (8), the negative refractive power is excessively strong, and accordingly the peripheral light flux results in being strongly flipped up. Then, the field curvature and the astigmatism increase regardless of the eye relief.

It is further preferred that the numerical value range in the conditional expressions (2) to (8) are set in the following way.

$$0.40 < f \times \{1/(f1 \times N1) + 1/(f2 \times N2) + 1/(f3 \times N3)\} < 0.77 \quad (2a)$$

$$0.00 < d12/d\text{total} < 0.14 \quad (3a)$$

$$0.00 < d23/d\text{total} < 0.12 \quad (4a)$$

$$-0.90 < (R12+R11)/(R12-R11) < -0.15 \quad (5a)$$

$$0.50 < (R22+R21)/(R22-R21) < 3.40 \quad (6a)$$

$$-2.50 < (R32+R31)/(R32-R31) < -0.10 \quad (7a)$$

$$-0.38 < (y-y0)/y0 < -0.22 \quad (8a)$$

It is still further preferred that the numerical value range in the conditional expressions (2a) to (8a) are set in the following way.

$$0.50 < f \times \{1/(f1 \times N1) + 1/(f2 \times N2) + 1/(f3 \times N3)\} < 0.74 \quad (2b)$$

$$0.00 < d12/d\text{total} < 0.08 \quad (3b)$$

$$0.00 < d23/d\text{total} < 0.07 \quad (4b)$$

$$-0.84 < (R12+R11)/(R12-R11) < -0.19 \quad (5b)$$

$$0.65 < (R22+R21)/(R22-R21) < 3.30 \quad (6b)$$

$$-2.30 < (R32+R31)/(R32-R31) < -0.25 \quad (7b)$$

$$-0.35 < (y-y0)/y0 < -0.24 \quad (8b)$$

The observation optical system in each of the exemplary embodiments of the present invention will be described below. The observation optical system L0 in each of the exemplary embodiments includes in order from an observation side (eye point side): a first lens L1 having a positive refractive power; a second lens L2 having a negative refractive power; and a third lens L3 having a positive refractive power.

A ratio of the focal length of the first lens group L1 to the square root of the product of the focal length of the second lens L2 and the focal length of the third lens L3 is set so as to satisfy the conditional expression (1). Thereby, the observation optical system L0 strengthens the refractive power of the first lens L1 in the appropriate range, weakens the refractive power of the second lens L2 and the third lens L3 in the appropriate range, and reduces the variation of the astigmatism and the field curvature at the time when the eye relief has changed, while enlarging the viewing angle.

Furthermore, the observation optical system satisfy the conditional expression (2) concerning the Petzval sum of the observation optical system L0, and thereby suppress the field curvature, and reduce a change of the diopter scale even in a state in which the pupil has rotated. Furthermore, the observation optical system are designed so as to satisfy a conditional expression (3) concerning a ratio of a distance on the optical axis between the first lens L1 and the second lens L2 to a distance on the optical axis between the lens surface Ra of the observation side of the first lens L1 and the lens surface of the image displaying surface side of the third lens L3. Thereby, the second lens L2 can be provided at a position at which an incidence height of the peripheral light flux is low, and the observation optical system L0 reduces increases of the field curvature and the astigmatism due to the refraction of the light flux in the second lens L2.

Furthermore, the observation optical system are designed so as to satisfy a conditional expression (4) concerning a ratio of a distance on the optical axis between the second lens L2 and the third lens L3 to a distance on the optical axis between the lens surface of the observation side of the first lens L1 and the lens surface of the image displaying surface side of the third lens L3. Thereby, the third lens L3 can be provided at a position at which an incidence height of the peripheral light flux is low, and the observation optical system L0 reduces increases of the field curvature and the astigmatism due to the refraction of the light flux in the third lens L3. Furthermore, the observation optical system satisfy a conditional expression (5) concerning a shape factor of the first lens L1, and thereby the curvature of the lens surface of the image displaying surface side, in particular, does not excessively become strong. Thus, the observation optical system L0 reduces the increase of the field curvature and the astigmatism.

Furthermore, the observation optical system satisfy a conditional expression (6) concerning a shape factor of the second lens L2, and thereby the curvature of the lens surface of the observation side, in particular, does not excessively become strong. Thus, the observation optical system L0 reduces the increases of the field curvature and the astigmatism. Furthermore, the observation optical system satisfy a conditional expression (7) concerning a shape factor of the third lens L3, and thereby the curvature of the lens surface of the image displaying surface side, in particular, does not excessively become strong. Thus, the observation optical system L0 reduces the increases of the field curvature and the astigmatism. Furthermore, the observation optical system are designed so as to satisfy a conditional expression (8) concerning an amount of distortion of the observation optical system L0. Thereby, any of the refractive powers of the lens having the positive refractive power and the lens having the negative refractive power does not excessively become strong, and the observation optical system L0 reduces the increases of the field curvature and the astigmatism.

In Exemplary Embodiments 1 and 2, the lens surface of the observation side of the first lens L1 is formed into an aspherical surface shape, and the field curvature and the astigmatism in a state in which the eye relief is long are adequately corrected. In Exemplary Embodiments 1 to 5, the lens surface of the observation side of the third lens L3 is formed into an aspherical surface shape, and the field curvature and the astigmatism in a state in which the eye relief is long are adequately corrected. In Exemplary Embodiment 1, the lens surface of the image displaying surface side of the third lens L3 is formed into an aspherical surface shape, and the astigmatism in a state in which the eye relief is short is adequately corrected. In Exemplary Embodiment 2, the lens surface of the observation side of the second lens L2 is formed into an aspherical surface shape, and the field curvature and the astigmatism in a state in which the eye relief is long are adequately corrected. Further, at least one of lenses in the observation optical system according to the present invention may be a cemented lens.

In the above, favorable embodiments according to the present invention have been described, but the present invention is not limited to these embodiments, and can be modified and changed in various ways in such a range as not to deviate from the scope. For instance, when the present invention is combined with an image display surface of CRT, LCD and the like, electrical processing may be added to the display side depending on an amount of distortion aberration and an amount of lateral chromatic aberration.

Numerical data corresponding to each of the exemplary embodiments of the present invention will be shown below. In the following numerical data, in order from the observation side to the image displaying surface side, ri represents a paraxial curvature radius on the i-th surface, and di represents an axial distance between the i-th surface and the (i+1)-th surface. Furthermore, ndi represents a refractive index with respect to a d-line (wavelength=578.6 nm) of the i-th glass material, and vdi represents an Abbe number with respect to the d-line of the i-th glass material. A stop SP is represented by r1.

Incidentally, a unit of the length is [mm] unless otherwise noted. However, the observation optical system L0 can obtain the equivalent optical performance even when having been proportionally enlarged or proportionally reduced, and accordingly the unit is not limited to [mm] and the other appropriate unit can be used. Incidentally, in the numerical data, a surface for which * is written in a column of Surface number has an aspherical shape defined in the following expression (9).

$$x = \frac{h^2/R}{1+\sqrt{1-(1+k)(h/R)^2}} + A4 \times h^4 + A6 \times h^6 + A8 \times h^8 + A10 \times h^{10} \quad (9)$$

Incidentally, in Expression 1, x represents a distance in an optical axis direction from a vertex of the lens surface; h represents a height in a direction perpendicular to the optical axis; R represents a paraxial curvature radius at the vertex of the lens surface; k represents a conical constant; and A4, A6, A8 and A10 each represent a polynomial coefficient (aspherical coefficient). In the table illustrating the aspherical coefficients, "e-i" represents an exponential expression in which 10 is the base, in other words, represents "$10^{-i}$". A relationship between each of the above-described conditional expressions and various numerical values in numerical examples is illustrated in Table 1.

Exemplary Embodiment 1

Unit mm

Surface data

| Surface number | r | d | nd | vd | Effective diameter |
|---|---|---|---|---|---|
| 1 (Stop) | ∞ | (Variable) | | | 3.50 |
| 2* | 227.321 | 12.75 | 1.69680 | 55.5 | 46.10 |
| 3 | −41.564 | 0.15 | | | 51.00 |
| 4 | −89.228 | 4.00 | 1.84666 | 23.8 | 55.96 |
| 5 | 443.027 | 1.74 | | | 64.72 |
| 6* | −5614.701 | 15.40 | 1.77250 | 49.6 | 65.07 |
| 7* | −65.143 | (Variable) | | | 69.68 |
| Image plane | ∞ | | | | |

Aspherical surface data

Second surface

K = 0.00000e+000  A4 = −5.38982e−006  A6 = 9.26789e−009
A8 = −1.39354e−011  A10 = 6.77348e−015

Sixth surface

K = 0.00000e+000  A4 = 3.46712e−008  A6 = 2.77586e−010
A8 = −2.61351e−012  A10 = 2.81884e−015  A12 = −8.40445e−019

Seventh surface

K = 0.00000e+000  A4 = 1.88792e−008  A6 = −5.57207e−010
A8 = −2.29416e−013  A10 = −8.72376e−017

Various data

| Eye relief | 10.00 | 20.00 | 26.00 |
|---|---|---|---|
| Focal length | 54.00 | 54.00 | 54.00 |
| F-number | 15.43 | 15.43 | 15.43 |
| Half angle of view (degree) | 44.60 | 39.29 | 34.74 |
| Image height | 53.24 | 44.19 | 37.44 |
| Total lens length | 90.79 | 100.79 | 106.79 |
| BF | 46.75 | 46.75 | 46.75 |
| d1 | 10.00 | 20.00 | 26.00 |
| d7 | 46.75 | 46.75 | 46.75 |

Single lens data

| Lens | Leading surface | Focal length |
|---|---|---|
| L1 | 1 | 51.43 |
| L2 | 4 | −87.42 |
| L3 | 6 | 85.21 |

Exemplary Embodiment 2

Unit mm

Surface data

| Surface number | r | d | nd | vd | Effective diameter |
|---|---|---|---|---|---|
| 1 (Stop) | ∞ | (Variable) | | | 3.50 |
| 2* | 285.563 | 13.05 | 1.53156 | 55.8 | 35.84 |
| 3 | −26.487 | 0.15 | | | 40.89 |
| 4* | −34.404 | 4.00 | 1.63550 | 23.9 | 43.44 |
| 5 | −114.385 | 1.00 | | | 51.33 |
| 6* | 106.685 | 17.64 | 1.53156 | 55.8 | 61.08 |
| 7 | −60.000 | (Variable) | | | 64.00 |
| Image plane | ∞ | | | | |

Aspherical surface data

Second surface

K = 0.00000e+000  A4 = 1.12503e−005  A6 = −5.76267e−008
A8 = 3.02125e−011  A10 = −3.99871e−014

Fourth surface

K = 0.00000e+000  A4 = −2.53346e−005  A6 = 6.67721e−008
A8 = −2.27478e−011

Sixth surface

K = 0.00000e+000  A4 = 9.81955e−006  A6 = −3.48881e−008
A8 = 4.33651e−011  A10 = −2.34247e−014  A12 = 4.20163e−018

Various data

| Eye relief | 10.00 | 20.00 | 26.00 |
|---|---|---|---|
| Focal length | 48.00 | 48.00 | 48.00 |
| F-number | 13.71 | 13.71 | 13.71 |
| Half angle of view (degree) | 39.37 | 34.35 | 27.64 |
| Image height | 39.38 | 32.81 | 25.14 |
| Total lens length | 84.52 | 94.52 | 100.52 |
| BF | 38.67 | 38.67 | 38.67 |
| d1 | 10.00 | 20.00 | 26.00 |
| d7 | 38.67 | 38.67 | 38.67 |

Single lens data

| Lens | Leading surface | Focal length |
|---|---|---|
| L1 | 1 | 46.27 |
| L2 | 4 | −78.96 |
| L3 | 6 | 75.00 |

Exemplary Embodiment 3

Unit mm

Surface data

| Surface number | r | d | nd | vd | Effective diameter |
|---|---|---|---|---|---|
| 1 (Stop) | ∞ | (Variable) | | | 3.50 |
| 2 | 66.875 | 12.71 | 1.88300 | 40.8 | 38.94 |
| 3 | −44.740 | 1.86 | | | 41.05 |
| 4 | −35.000 | 4.00 | 1.92286 | 18.9 | 41.04 |
| 5 | −80.575 | 0.15 | | | 45.63 |
| 6* | 113.807 | 11.99 | 1.59522 | 67.7 | 48.39 |
| 7 | −50.000 | (Variable) | | | 50.35 |
| Image plane | ∞ | | | | |

Aspherical surface data
Sixth surface

K = 0.00000e+000   A4 = −1.30020e−005   A6 = 4.98066e−008
A8 = −1.48622e−010   A10 = 2.19300e−013   A12 = −1.24019e−016

Various data

| | | | |
|---|---|---|---|
| Eye relief | 10.00 | 20.00 | 26.00 |
| Focal length | 32.80 | 32.80 | 32.80 |
| F-number | 9.37 | 9.37 | 9.37 |
| Half angle of view (degree) | 38.03 | 32.56 | 27.72 |
| Image height | 25.65 | 20.94 | 17.23 |
| Total lens length | 62.43 | 72.43 | 78.43 |
| BF | 21.72 | 21.72 | 21.72 |
| d1 | 10.00 | 20.00 | 26.00 |
| d7 | 21.72 | 21.72 | 21.72 |

Single lens data

| 1Lens | Leading surface | Focal length |
|---|---|---|
| L1 | 1 | 32.07 |
| L2 | 4 | −70.00 |
| L3 | 6 | 60.00 |

Exemplary Embodiment 4

Unit mm

Surface data

| Surface number | r | d | nd | vd | Effective diameter |
|---|---|---|---|---|---|
| 1 (Stop) | ∞ | (Variable) | | | 3.50 |
| 2 | 595.264 | 12.88 | 1.85400 | 40.4 | 54.31 |
| 3 | −60.287 | 2.00 | | | 58.81 |
| 4 | −51.894 | 4.00 | 1.92286 | 18.9 | 59.16 |
| 5 | −151.971 | 1.92 | | | 69.33 |
| 6* | −145.860 | 13.04 | 1.85135 | 40.1 | 69.64 |
| 7 | −52.632 | (Variable) | | | 74.29 |
| Image plane | ∞ | | | | |

Aspherical surface data
Sixth surface

K = 0.00000e+000   A4 = −2.81779e−006   A6 = 4.52965e−009
A8 = −5.27046e−012   A10 = 3.29024e−015   A12 = −8.52182e−019

Various data

| | | | |
|---|---|---|---|
| Eye relief | 10.00 | 20.00 | 26.00 |
| Focal length | 70.11 | 70.11 | 70.11 |
| F-number | 20.03 | 20.03 | 20.03 |
| Half angle of view (degree) | 46.36 | 40.61 | 37.69 |
| Image height | 73.51 | 60.11 | 54.16 |
| Total lens length | 111.40 | 121.40 | 127.40 |
| BF | 67.56 | 67.56 | 67.56 |
| d1 | 10.00 | 20.00 | 26.00 |
| d7 | 67.56 | 67.56 | 67.56 |

Single lens data

| Lens | Leading surface | Focal length |
|---|---|---|
| L1 | 1 | 64.69 |
| L2 | 4 | −87.06 |
| L3 | 6 | 90.88 |

Exemplary Embodiment 5

Unit mm

Surface data

| Surface number | r | d | nd | vd | Effective diameter |
|---|---|---|---|---|---|
| 1 (Stop) | ∞ | (Variable) | | | 3.50 |
| 2 | 157.671 | 17.71 | 1.81600 | 46.6 | 53.94 |
| 3 | −44.740 | 3.00 | | | 57.71 |
| 4 | −37.870 | 4.00 | 1.84666 | 23.8 | 57.74 |
| 5 | −71.835 | 0.15 | | | 66.97 |
| 6* | 245.302 | 19.82 | 1.53156 | 55.8 | 73.44 |
| 7 | −50.000 | (Variable) | | | 76.76 |
| Image plane | ∞ | | | | |

Aspherical surface data
Sixth surface

K = 0.00000e+000   A4 = −6.54253e−006   A6 = 1.40751e−008
A8 = −2.07698e−011   A10 = 1.41217e−014   A12 = −3.58207e−018

Various data

| | | | |
|---|---|---|---|
| Eye relief | 10.00 | 20.00 | 26.00 |
| Focal length | 45.00 | 45.00 | 45.00 |
| F-number | 12.86 | 12.86 | 12.86 |
| Half angle of view (degree) | 43.74 | 37.62 | 33.62 |
| Image height | 43.06 | 34.68 | 29.92 |
| Total lens length | 85.29 | 95.29 | 101.29 |
| BF | 30.60 | 30.60 | 30.60 |

-continued

| Unit mm | | | |
|---|---|---|---|
| d1 | 10.00 | 20.00 | 26.00 |
| d7 | 30.60 | 30.60 | 30.60 |

| Single lens data | | |
|---|---|---|
| Lens | Leading surface | Focal length |
| L1 | 1 | 44.46 |
| L2 | 4 | −100.00 |
| L3 | 6 | 80.00 |

TABLE 1

| Exemplary Embodiment | Conditional expression 1 | Conditional expression 2 | Conditional expression 3 | Conditional expression 4 | Conditional expression 5 | Conditional expression 6 | Conditional expression 7 | Conditional expression 8 |
|---|---|---|---|---|---|---|---|---|
| 1 | 0.596 | 0.642 | 0.004 | 0.051 | −0.691 | 0.665 | −1.023 | −0.291 |
| 2 | 0.601 | 0.723 | 0.004 | 0.028 | −0.830 | 1.860 | −0.280 | −0.312 |
| 3 | 0.495 | 0.642 | 0.061 | 0.005 | −0.198 | 2.536 | −0.390 | −0.344 |
| 4 | 0.727 | 0.582 | 0.059 | 0.057 | −0.816 | 2.037 | −2.129 | −0.250 |
| 5 | 0.497 | 0.681 | 0.067 | 0.003 | −0.558 | 3.230 | −0.661 | −0.306 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-117448, filed Jun. 10, 2015, which is hereby incorporated by reference herein in its entirety.

What is claimed is:

1. An observation optical system for observation of an image displayed on an image display surface comprising, in order from an observation side to an image displaying surface side:
a first lens having a positive refractive power; a second lens having a negative refractive power; and a third lens having a positive refractive power, wherein the following conditional expressions are satisfied:

$$0.40 < \frac{f1}{\sqrt{-f2 \times f3}} < 0.80,$$

and $$-1.00 < (R12+R11)/(R12-R11) < -0.10,$$

where a focal length of the first lens is represented by f1, a focal length of the second lens is represented by f2, a focal length of the third lens is represented by f3, a curvature radius of a lens surface in an observation side of the first lens is represented by R11, and a curvature radius of a lens surface in an image displaying surface side of the first lens is represented by R12.

2. The observation optical system according to claim 1, wherein the following conditional expression is satisfied:

$$0.30 < f \times \{1/(f1 \times N1) + 1/(f2 \times N2) + 1/(f3 \times N3)\} < 0.80,$$

where a refractive index of a material of the first lens is represented by N1, a refractive index of a material of the second lens is represented by N2, a refractive index of a material of the third lens is represented by N3, and a focal length of the observation optical system is represented by f.

3. The observation optical system according to claim 1, wherein the following conditional expression is satisfied:

$$0.00 < d12/dtotal < 0.20,$$

where a distance on an optical axis between the first lens and the second lens is represented by d12, and a length on an optical axis from a lens surface in an observation side of the first lens to a lens surface in an image displaying surface side of the third lens is represented by dtotal.

4. The observation optical system according to claim 1, wherein the following conditional expression is satisfied:

$$0.00 < d23/dtotal < 0.20,$$

where a distance on an optical axis between the second lens and the third lens is represented by d23, and a length on an optical axis from a lens surface in an observation side of the first lens to a lens surface in an image displaying surface side of the third lens is represented by dtotal.

5. The observation optical system according to claim 1, wherein the following conditional expression is satisfied:

$$0.30 < (R22+R21)/(R22-R21) < 3.50,$$

where a curvature radius of a lens surface in an observation side of the second lens is represented by R21, and a curvature radius of a lens surface in an image displaying surface side of the second lens is represented by R22.

6. The observation optical system according to claim 1, wherein the following conditional expression is satisfied:

$$-3.00 < (R32+R31)/(R32-R31) < -0.05,$$

where a curvature radius of a lens surface in an observation side of the third lens is represented by R31, and a curvature radius of a lens surface in an image displaying surface side of the third lens is represented by R32.

7. The observation optical system according to claim 1, wherein the following conditional expression is satisfied:

$$-0.40 < (y-y0)/y0 < -0.20,$$

where an actual image height on an image displaying surface side when an eye relief is 10 mm and a half viewing angle is 50 degrees is represented by y, and an ideal image height on an image displaying surface side when an eye relief is 10 mm and an half viewing angle is 50 degrees is represented by y0.

8. An image displaying apparatus comprising:
an image display element that displays image information; and
the observation optical system according to claim 1 for observation of the image information displayed on the image display element.

9. An observation optical system for observation of an image displayed on an image display surface comprising, in order from an observation side to an image displaying surface side:
a first lens having a positive refractive power; a second lens having a negative refractive power; and a third lens having a positive refractive power,
wherein the following conditional expressions are satisfied:

$$0.40 < \frac{f1}{\sqrt{-f2 \times f3}} < 0.80,$$

and $-3.00<(R32+R31)/(R32-R31)<-0.05$, where a focal length of the first lens is represented by f1, a focal length of the second lens is represented by f2, a focal length of the third lens is represented by f3, a curvature radius of a lens surface in an observation side of the third lens is represented by R31, and a curvature radius of a lens surface in an image displaying surface side of the third lens is represented by R32.

10. The observation optical system according to claim 9, wherein the following conditional expression is satisfied:

$0.30<(R22+R21)/(R22-R21)<3.50$, where a curvature radius of a lens surface in an observation side of the second lens is represented by R21, and a curvature radius of a lens surface in an image displaying surface side of the second lens is represented by R22.

11. The observation optical system according to claim 9, wherein the following conditional expression is satisfied:

$-0.40<(y-y0)/y0<-0.20$, where an actual image height on an image displaying surface side when an eye relief is 10 mm and a half viewing angle is 50 degrees is represented by y, and an ideal image height on an image displaying surface side when an eye relief is 10 mm and an half viewing angle is 50 degrees is represented by y0.

12. An image displaying apparatus comprising:
an image display element that displays image information; and
the observation optical system according to claim 9 for observation of the image information displayed on the image display element.

13. An observation optical system for observation of an image displayed on an image display surface comprising, in order from an observation side to an image displaying surface side:
a first lens having a positive refractive power; a second lens having a negative refractive power; and a third lens having a positive refractive power,
wherein the following conditional expressions are satisfied:

$$0.40 < \frac{f1}{\sqrt{-f2 \times f3}} < 0.80,$$

and $-0.40<(y-y0)/y0<-0.20$, where a focal length of the first lens is represented by f1, a focal length of the second lens is represented by f2, a focal length of the third lens is represented by f3, an actual image height on an image displaying surface side when an eye relief is 10 mm and a half viewing angle is 50 degrees is represented by y, and an ideal image height on an image displaying surface side when an eye relief is 10 mm and an half viewing angle is 50 degrees is represented by y0.

14. An image displaying apparatus comprising:
an image display element that displays image information; and
the observation optical system according to claim 13 for observation of the image information displayed on the image display element.

* * * * *